(12) United States Patent
Fujiwara et al.

(10) Patent No.: US 6,434,102 B1
(45) Date of Patent: Aug. 13, 2002

(54) DISK DEVICE

(75) Inventors: Tatsunori Fujiwara; Takao Morimoto; Masao Sato, all of Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/672,008

(22) Filed: Sep. 29, 2000

Related U.S. Application Data

(63) Continuation of application No. PCT/JP99/00598, filed on Feb. 12, 1999.

(51) Int. Cl.$^7$ ............................................. G11B 33/02
(52) U.S. Cl. ................................................... 369/77.2
(58) Field of Search .............................. 369/75.1–75.2, 369/77.1–77.2, 178

(56) References Cited

U.S. PATENT DOCUMENTS 6,292,452 B1 * 9/2001 Endo et al. ................. 369/77.2
6,301,215 B1 * 10/2001 Otsuki et al. ............... 369/77.2

FOREIGN PATENT DOCUMENTS

| JP | 07201113 | 8/1995 |
| JP | 887796 | 4/1996 |
| JP | 8167212 | 6/1996 |

* cited by examiner

*Primary Examiner*—Allen Cao
(74) *Attorney, Agent, or Firm*—Birch, Stewart, Kolasch & Birch, LLP

(57) ABSTRACT

A disk device is comprised of a feed roller displacement mechanism which displaces a position of a feed roller 11 to a position lower than a position when a CD 200 is inserted. When a CD 200 is ejected from the turntable, the position of the feed roller 11 displaced downwardly is returned to an initial insertion position.

2 Claims, 22 Drawing Sheets

DISK DEVICE

CROSS-REFERENCE TO THE RELATED APPLICATION

This Application is a continuation of International Application No. PCT/JP99/00598, whose International filing date is Feb. 12, 1999, the disclosures of which Application are incorporated by reference herein.

BACKGROUND OF THE INVENTION

1. Field of the Invention

The present invention relates to a disk device which can be used with circular disks of different outer diameters and cartridge-stored disk used in cartridge-stored form.

2. Description of the Related Art

FIG. 1 is a perspective figure of a conventional disk device. This type of disk device in particular is comprised of a sliding feed mechanism on an optical pickup which is provided in a disk device which can be used with disks of different outer diameters. In the figure, reference numeral 201 denotes a CD (compact disk), 201a is a pit, 202 is an optical pickup, 203 is a support point, 204 is a swing arm, 205 is a tracking coil, 211 is an objective lens, 212 is a collimator lens, 213 is a wedge-shaped prism, 214 is a rectangular prism, 215 is a laser diode, 216 photo diode, 221 is a disk motor, 231 is a convey roller for a CD 201.

The operation of the conventional disk device will be explained below.

In this disk device, an optical pickup 202 provided on a tip of a swing arm 204 defines a circular orbit about a support point 203. The entire pickup displaces on the on the rear face of a CD 201 and perform tracking. In such a case, the direction in which the pickup moves on the circular orbit is shown by the arrow B—B and this line is orthogonal to the conveying direction (direction of insertion/retraction) of the CD shown by the arrow A—A".

After the CD 201 is positioned in a fixed recording/playing position, the roller 231 must be removed from the rear face of the CD 201. A structure of this type which raises the turntable is disclosed in JP-A 8-87796.

Since the conventional disk device is constructed in the above manner, the device is complicated by the fact that the roller 231 separates from the rear face of the CD 201 after the CD 201 has been placed in a fixed recording/playing position.

As a result, attempts have been made to simplify the structure and maintain the reliability of feeding disks of differing outer diameters. For example, it has been proposed that the roller 231 describes an arc shaped orbit when it descends and that the roller 231 rise in a direction of the disk motor 221 on the rear face of the CD 201. However since the optical pickup 202 and the like is disposed on the rear face of the CD 201, the roller 231 can not rise towards the disk motor 221. Thus, it has been difficult to simplify the structure and maintain the reliability of feeding disks of differing outer diameters.

SUMMARY OF THE INVENTION

The present invention is proposed to solve the above problem and has the object of providing a disk device which can be used with circular disks of different outer diameters and cartridge-stored disks with a simple structure. The disk device of the present invention can be used with high reliability to feed disks of different outer diameters.

The disk device of the present invention comprises an optical pickup which reads information recorded on a circular disk, a CD feed mechanism which has a feed roller which performs uptake and ejection of circular disks, a clamp mechanism which mounts the central section of a circular disk taken up by the CD feed mechanism onto a turntable by being pressed upwardly by a clamp lever, an MD feed mechanism which uptakes a cartridge-stored disk, mounts the cartridge-stored disk which has been taken up onto a turntable and which ejects the cartridge-stored disk from the turntable. The MD feed mechanism performs the above due to the displacement of a feed arm which forms a section of a link mechanism when the cartridge-stored disk is inserted into an MD holder. The disk device also comprises a clamp lever refuge mechanism which refuges a clamp lever of the clamp mechanism to a position which does not interfere with the uptake and ejection of cartridge-stored disks when a cartridge-stored disk is ejected or taken up by the MD feed mechanism. A feed roller displacement mechanism is provided which, together with the mounting of a circular disk which has been taken up by the CD feed mechanism onto the turntable displaces the position of the feed roller further towards the direction of disk insertion than the optical pickup and lower than the initial position of a circular disk when inserted. When the circular disk is ejected from the turntable, the feed roller displacement mechanism returns the position of the feed roller from a position lower and further towards the direction of disk insertion than the optical pickup to an initial position.

With the above structure an effect is created which can be used with circular disks of different outer diameters and cartridge-stored disks and which can maintain the feeding of circular disks of different outer diameters with a high reliability simple structure.

The disk device of the present invention is provided with a feed roller contact avoidance mechanism which raises an edge of an ejected circular disk which abuts with a feed roller and returns the feed roller to an initial position together with a return operation of a feed roller position by the feed roller displacement mechanism. The feed roller contact avoidance mechanism avoids contact with the edge of the circular disk by the feed roller which returns to an initial position.

With such an arrangement, the feed roller, which returns to an initial position when a circular disk is inserted, and the face of a circular disk may abut as they do not come into contact with the edge of the disk when the feed roller has returned to an initial position. Thus the reliability of feeding circular disks of different outer diameters is increased.

DETAILED DESCRIPTION OF THE PREFERRED EMBODIMENTS

In order to explain the invention in greater detail, the preferred embodiments are outlined below with reference to the accompanying figures.

Embodiment 1

Figure 1:
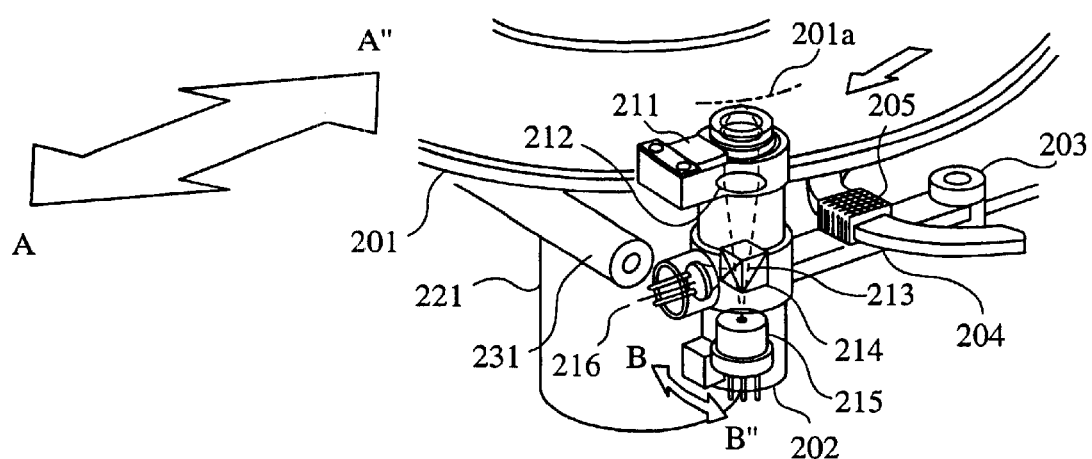
FIG. 1 is a perspective figure of the structure of a sliding feed mechanism of an optical pickup of a conventional disk device.
Figure 2:
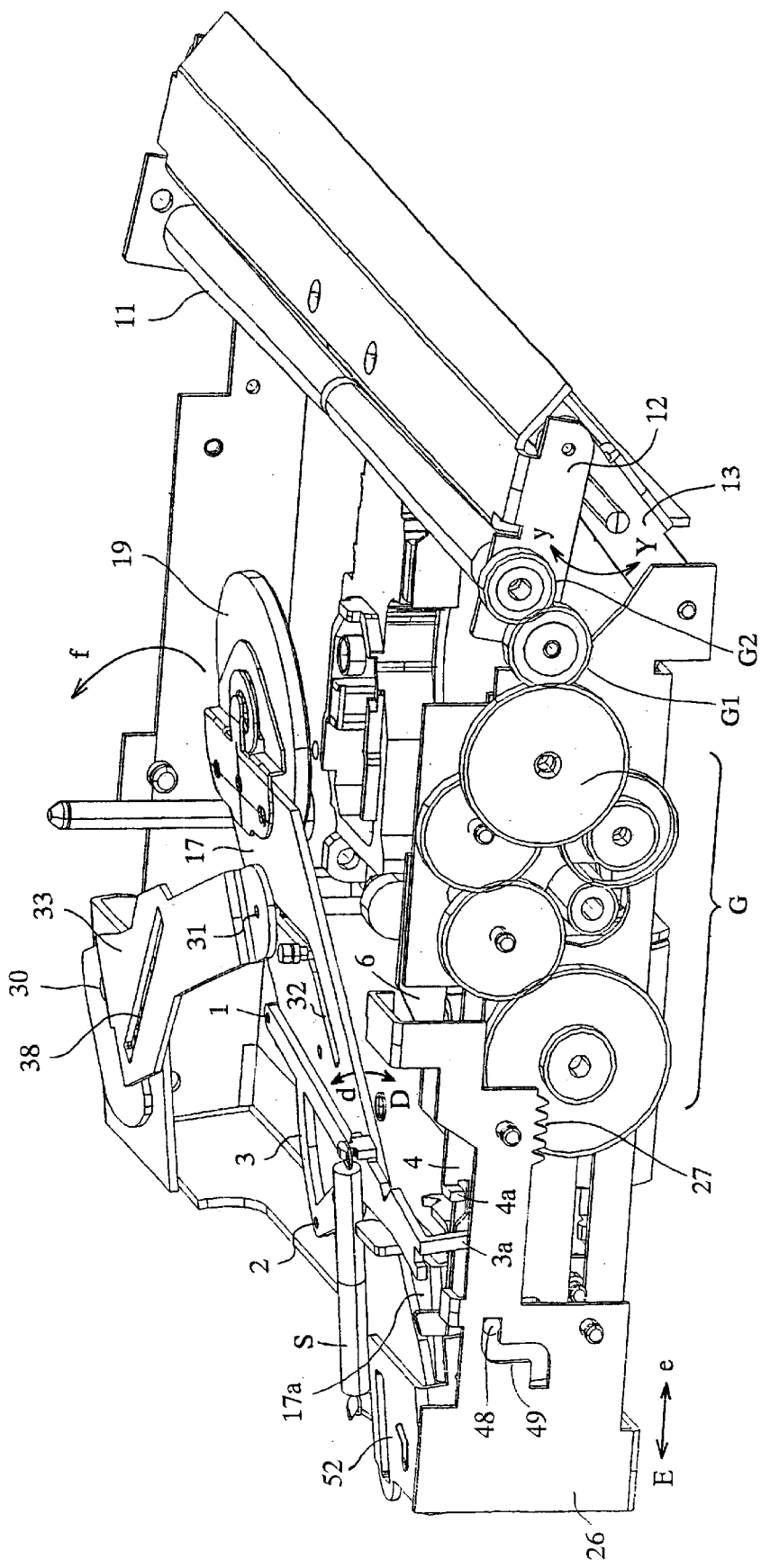
FIG. 2 shows a three dimensional view of disk device according to a first embodiment of the invention.

FIG. 1 is a three dimensional representation of a disk device according to a first embodiment of the present invention. FIG. 2 shows a first embodiment of the disk device seen from a different perspective with internal components omitted. In the figures, 1 is a small diameter abutting pin which abuts with the outer circumference of a small disk when the inserted disk is an 8 cm disk (hereafter small disk). 2 is a large diameter abutting pin which abuts with the outer circumference of a large disk when the inserted disk is a 12 cm disk (hereafter large disk).

3 is a lever which has a small diameter abutting pin 1 or large diameter abutting pin 2 and which is rotatable about a support point 3b (not shown). 3a is an engaging piece which is formed on one end of the lever 3.

Figure 3:
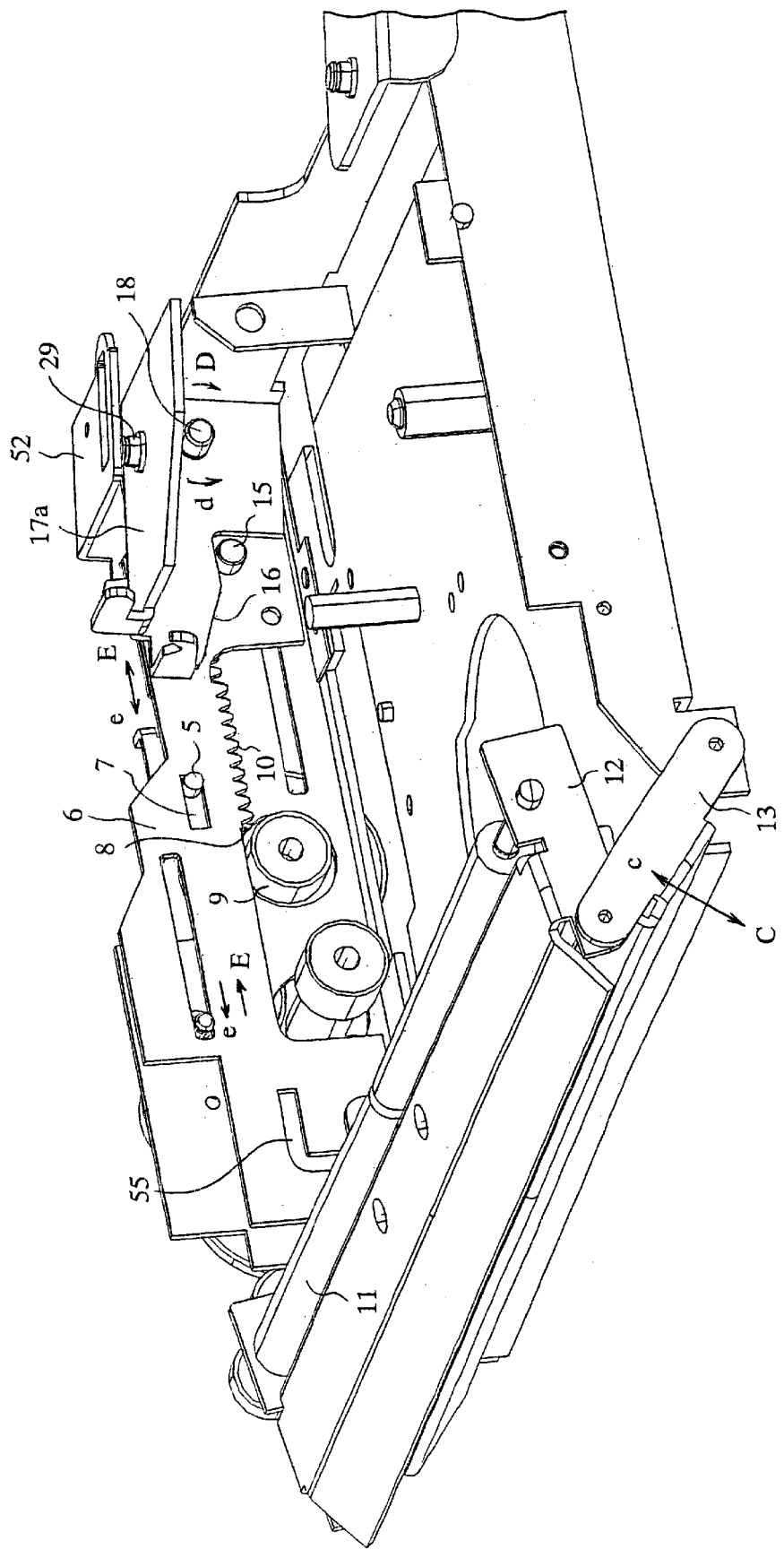
FIG. 3 shows a first embodiment of the disk device seen from a different perspective with internal components omitted.

4 is a first sliding plate formed by the engaging piece 4a and is formed so as to be slidable in the direction E and e of the arrow. A rack 8 is formed on the first sliding plate 4 as shown in FIG. 3 and is adapted to mesh with a gear 9 when it slides in the direction e. Furthermore a pin 5 as shown in FIG. 3 is formed on the first sliding plate 4 and engages with the slit 7 of the second sliding plate 6.

6 is a second sliding plate which is adapted to be slidable in the direction E and e of the arrow. A rack 10 is formed on the second sliding plate 6 as shown in FIG. 3 and is adapted to mesh with a gear 9 when it slides in the direction e. Furthermore a pin 15, a pin 21 (not shown) a slit 7 and a S-shaped elongated hole 55 are formed on the second sliding plate 6.

The symbol G in FIG. 2 denotes a gear unit, 11 is a feeding roller. The feeding roller 11 transmits the rotations of a drive motor (not shown) through a gear unit G and is adapted to rotate in a positive or negative direction depending on the insertion or ejection of small diameter disks, large diameter disks or cartridge disks (hereafter MD). As a result, a gear G2 is fixed to one end of the shaft of the feeding roller 11 and the gear G2 engages with a gear G1 formed on the gear unit G.

12 is a feeding roller support lever which supports the feeding roller 11 so as to be rotatable at both ends. The feeding roller support lever 12 is axially supported by shared use of the rotation shaft of the gear G1 which is formed on the gear unit G.

Figure 8:
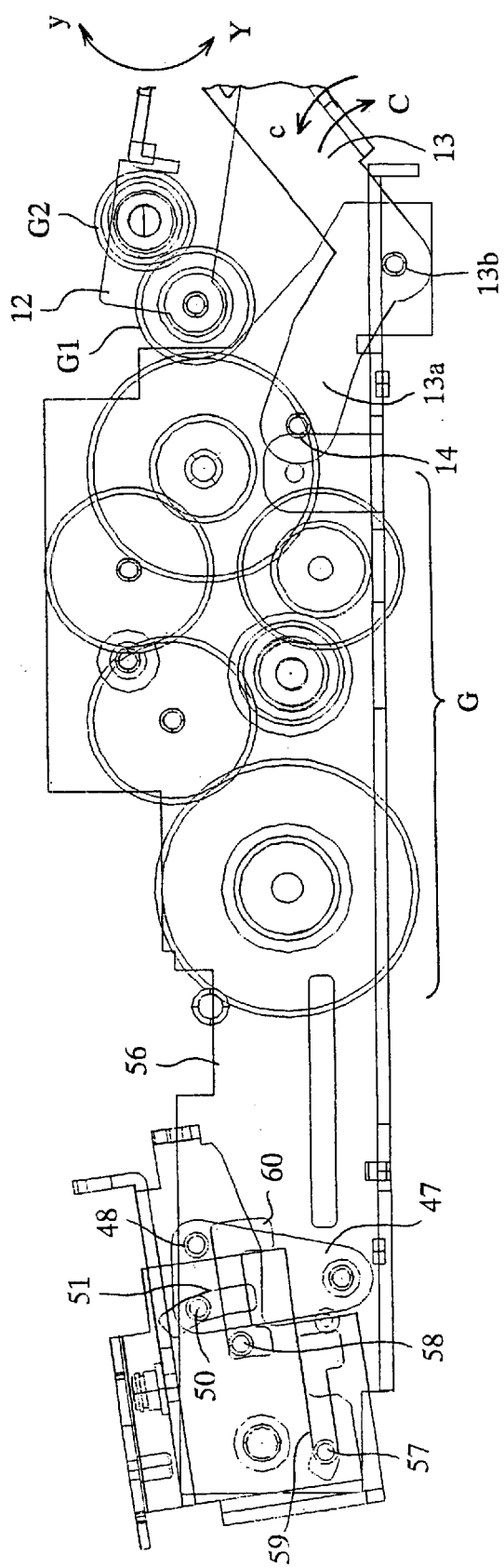
FIG. 8 is a lateral view of a disk device according to a first embodiment of the present invention.

13 is a lifting arm which rotates the feeding roller support lever 12 in the directions Y and y in order to raise the feeding roller 12. The lifting arm has an L-shaped extension section which comprises a pin 14 as shown in FIG. 8 and is adapted to rotate in the directions C and c about the shaft 13b. The pin 14 on the extension section 13a engages with the S-shaped elongated hole 55 on the second sliding plate 6 as shown in FIG. 3.

17 is a clamp lever which is provided with a clamp 19 on the tip. The clamp lever 17 is adapted to rotate in the direction f as shown in FIG. 2 and an L-shaped elongated hole 32 is formed on the clamp lever 17.

17a is a clamp lever supporting member which is provided with a rotating shaft 29 shown in FIG. 3 for supporting the clamp lever 17 so as to rotate in the direction f. The clamp lever supporting member 17a is adapted to rotate in the directions D and d about the rotation shaft 18 as shown in FIG. 3. A cam face 16 which engages with a pin 15 is formed on the clamp lever supporting member 17a.

26 in FIG. 2 is a third sliding plate. An S-shaped elongated hole 49 and a rack 27 are formed on the third sliding plate 26 and are adapted to rotate in the directions E and e of the arrow.

33 is a link lever formed on the elongated hole 38. The link lever 33 is adapted to rotate about the shaft 30 which acts as a center of rotation. A pin 31 which engages with the L-shaped elongated hole 32 of the clamp lever 17 is formed on the tip of the link lever 33.

Figure 4:
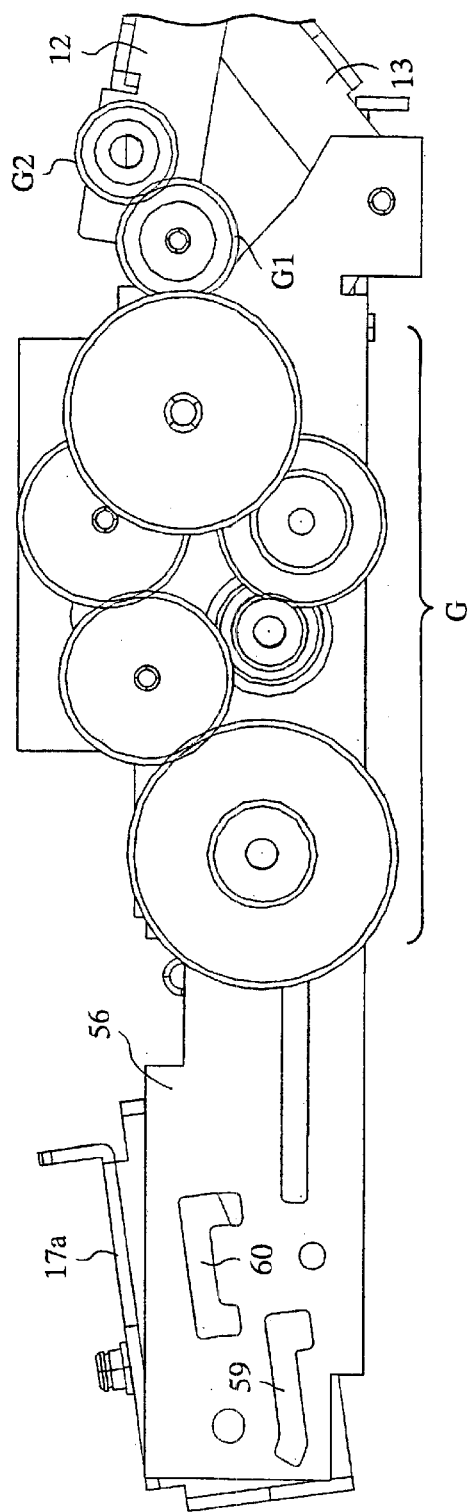
FIG. 4 is a lateral view of a disk device according to a first embodiment of the present invention seen from the gear unit with a third sliding plate removed.

FIG. 4 is a lateral view seen from the unit gear G of a disk device in FIG. 2 with the third sliding plate 26 removed. In this lateral figure the relay member 47 has been omitted. In the figure: 56 is a conveying plate of the gear unit G or the like and 59 and 60 are elongated holes.

Figure 6:
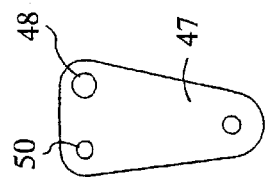
FIG. 6 is a component view showing a relay member in a disk device according to a first embodiment of the present invention.

The reference numeral 48 is a pin formed on the relay member 47 shown in FIG. 6 and which engages with an S-shaped elongated hole 49 as shown in FIG. 2.

Figure 5:
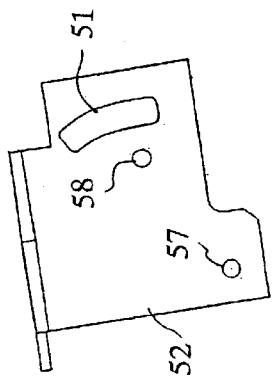
FIG. 5 is a component view showing an intermediate member in a disk device according to a first embodiment of the present invention.

52 is a intermediate member shown in FIG. 5 on which pins 57, 58 and an arc-shaped elongated hole 51 are formed.

Figure 7:
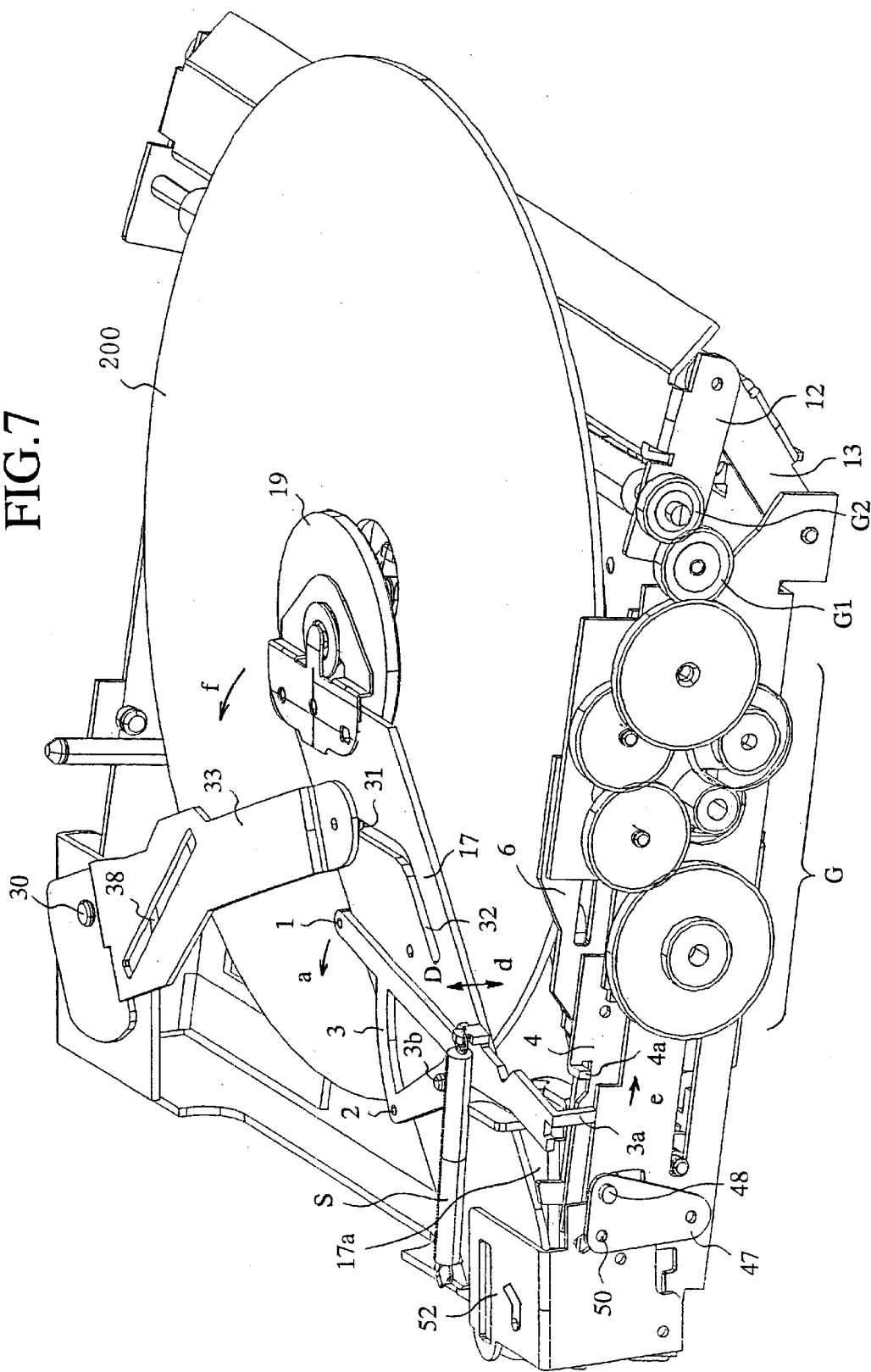
FIG. 7 is a three dimensional representation of the disk device according to a first embodiment of the present invention when a large diameter disk is inserted.

FIG. 7 is a three dimensional representation of the disk device according to the first embodiment when a large diameter disk is inserted. In FIG. 7, the same or similar components are represented by the same reference numerals and their explanation will be omitted. The third sliding plate 26 shown in FIG. 2 is omitted from FIG. 7 so as to clearly represent the relay member 47 which is disposed on the rear side of the third sliding plate 26. In the figure, 200 is a large diameter disk, S is a spring which compresses the tip formed on the small diameter disk abutting pin 1 of the lever 1 in a clockwise direction about the support point 3b.

FIG. 8 is a lateral figure which shows the structure of a disk device according to a first embodiment.

Figure 9:
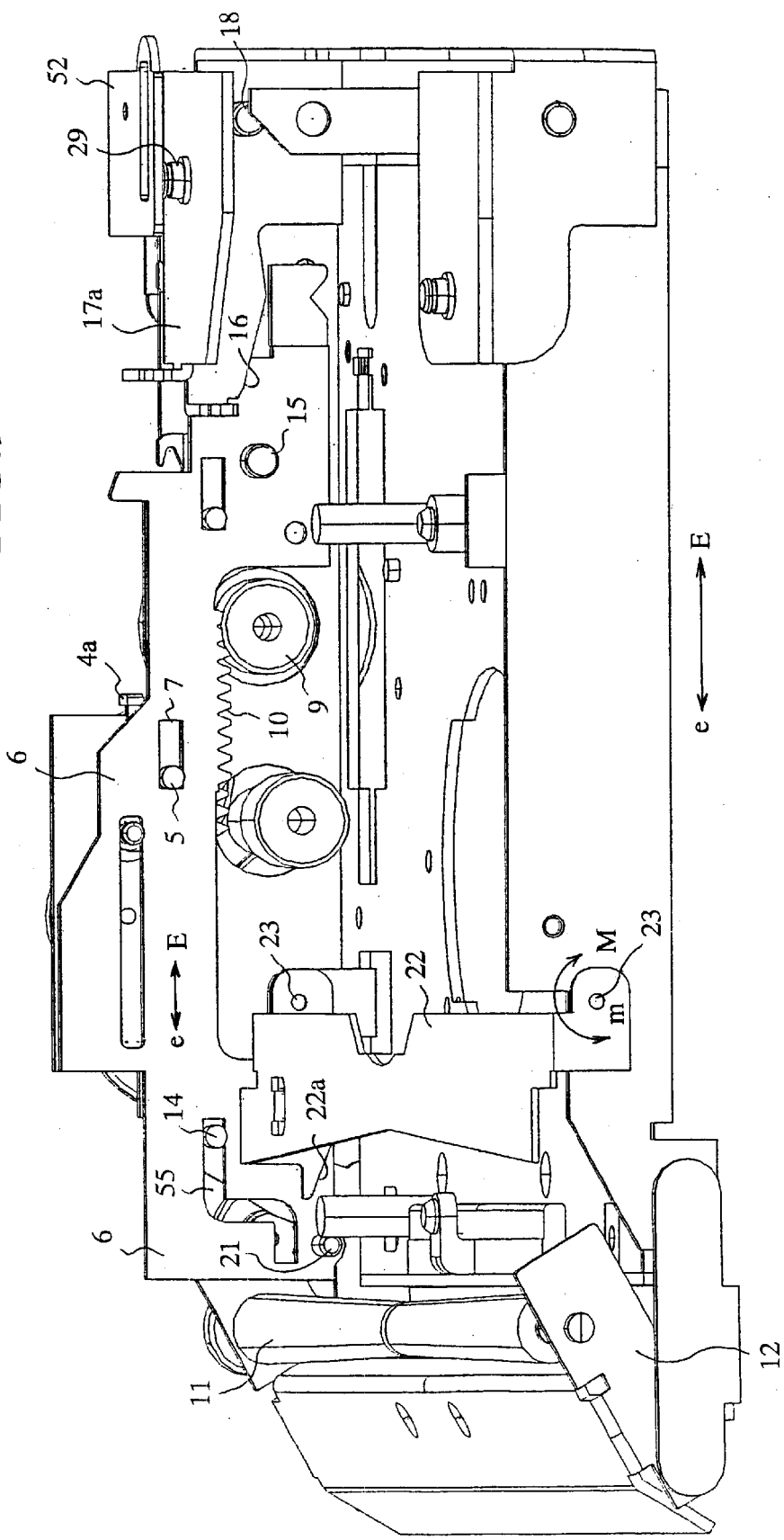
FIG. 9 is a three dimensional representation of the mechanism by which the feeding roller is prevented from coming into abutting contact with the edge of a small diameter disk in a disk device according to a first embodiment of the present invention.

FIG. 9 is a three dimensional representation of the mechanism by which the feeding roller is prevented from abutting with the edge of the small diameter disk by raising the peripheral section of the feeding roller abutting side of the small disk upwardly when the feeding roller 11 abuts with the rear face of the small disk and conveys the small disk. In the figure, 21 is a pin which is provided on the second sliding plate 6. 22 is a CD raising lever. A cam face 22a is formed on the CD raising lever 22. The CD raising lever 22 is adapted to rotate about the shaft 23 in the directions M and m when the pin 21 abuts with the cam face 22a.

Figure 10:
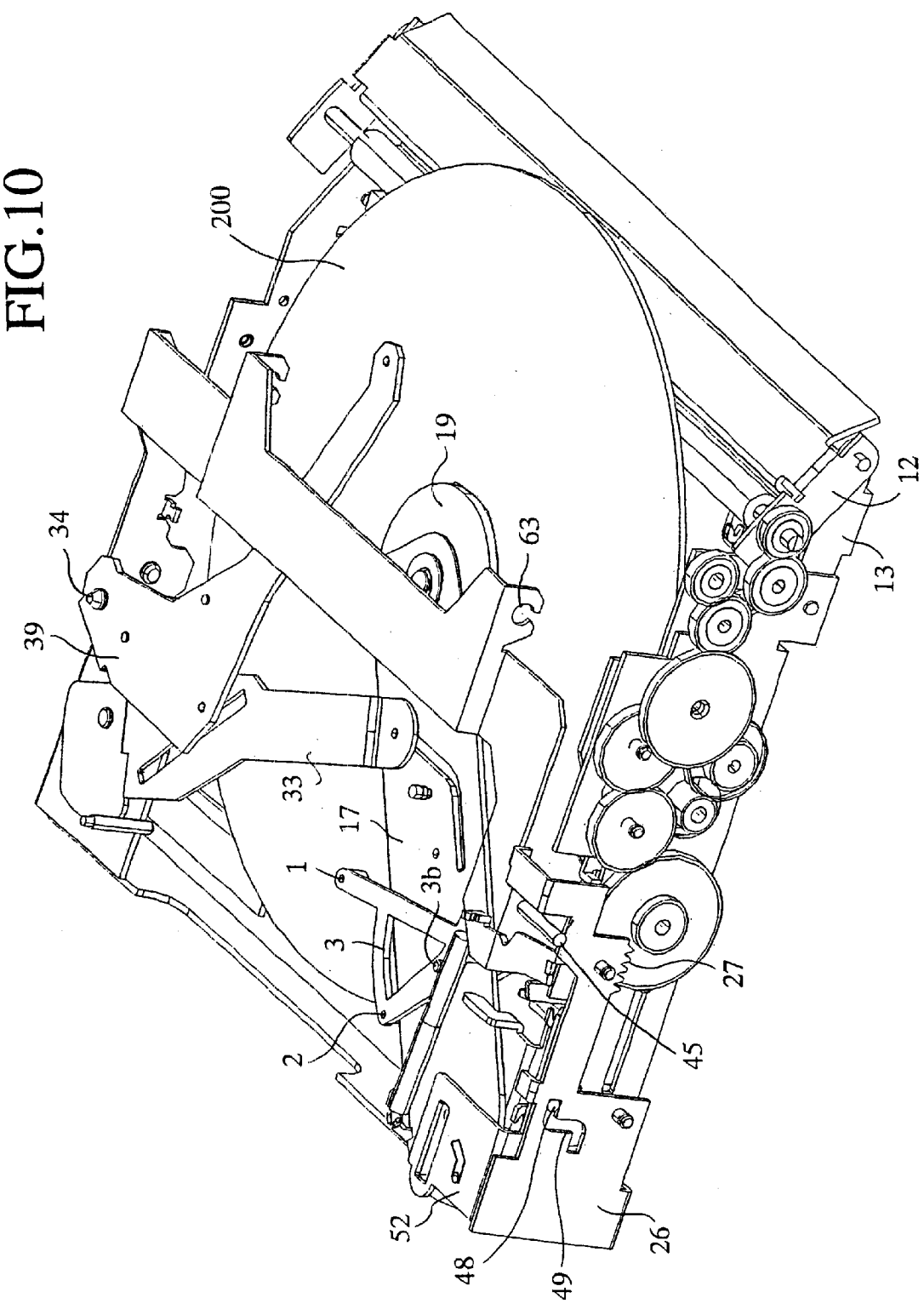
FIG. 10 is a three dimensional representation of the mechanism by which the center of a large diameter disk is conveyed onto a turntable in a disk device according to a first embodiment of the present invention.

FIG. 10 is a three dimensional representation of the mechanism by which the center of a CD (large diameter disk) 200 is conveyed onto a turntable in a disk device according to a first embodiment of the present invention.

Figure 11:
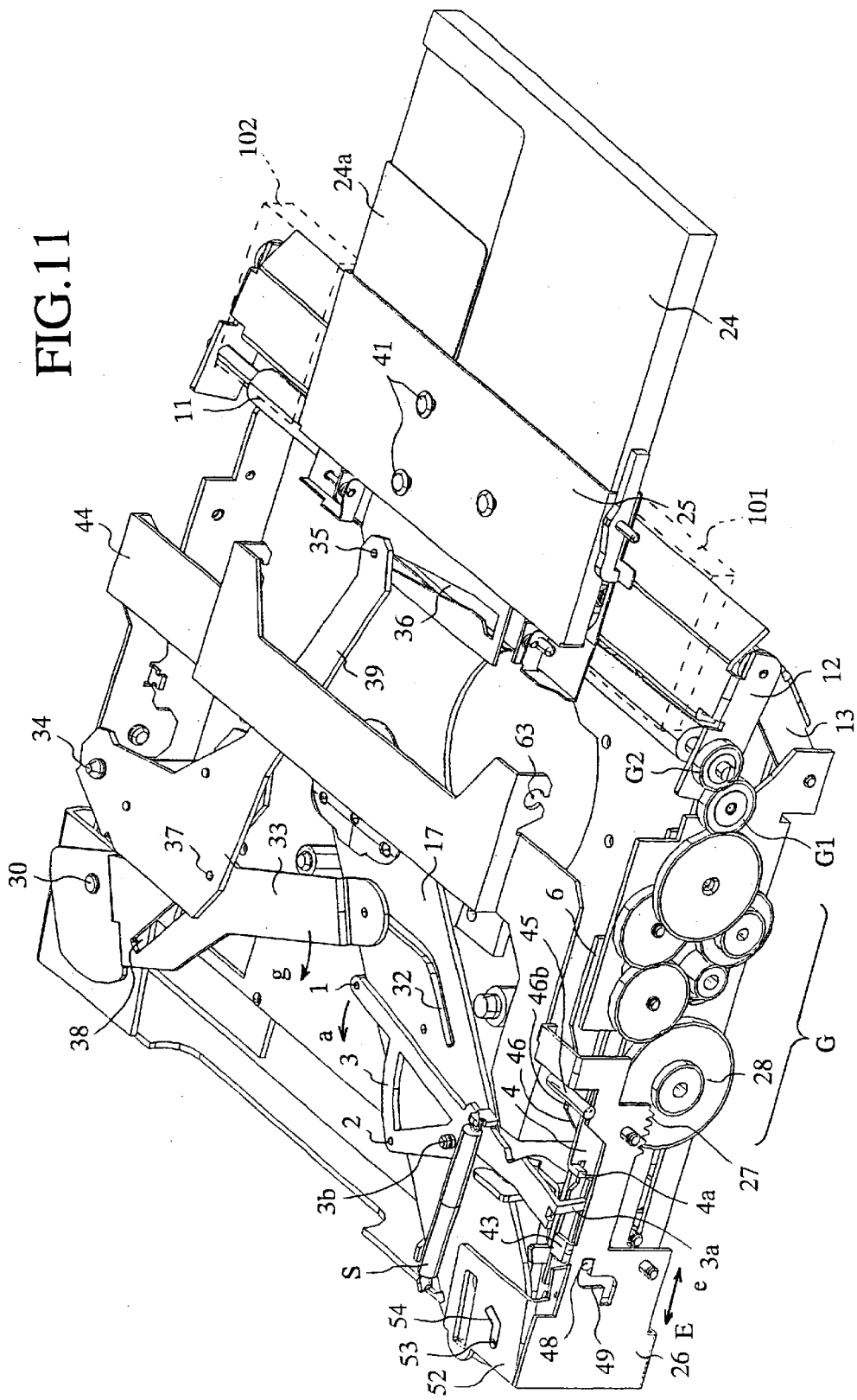
FIG. 11 is a three dimensional representation of the mechanism of a disk device to which a member which functions when an MD is loaded has been added in a disk device according to a first embodiment of the present invention.
Figure 14:
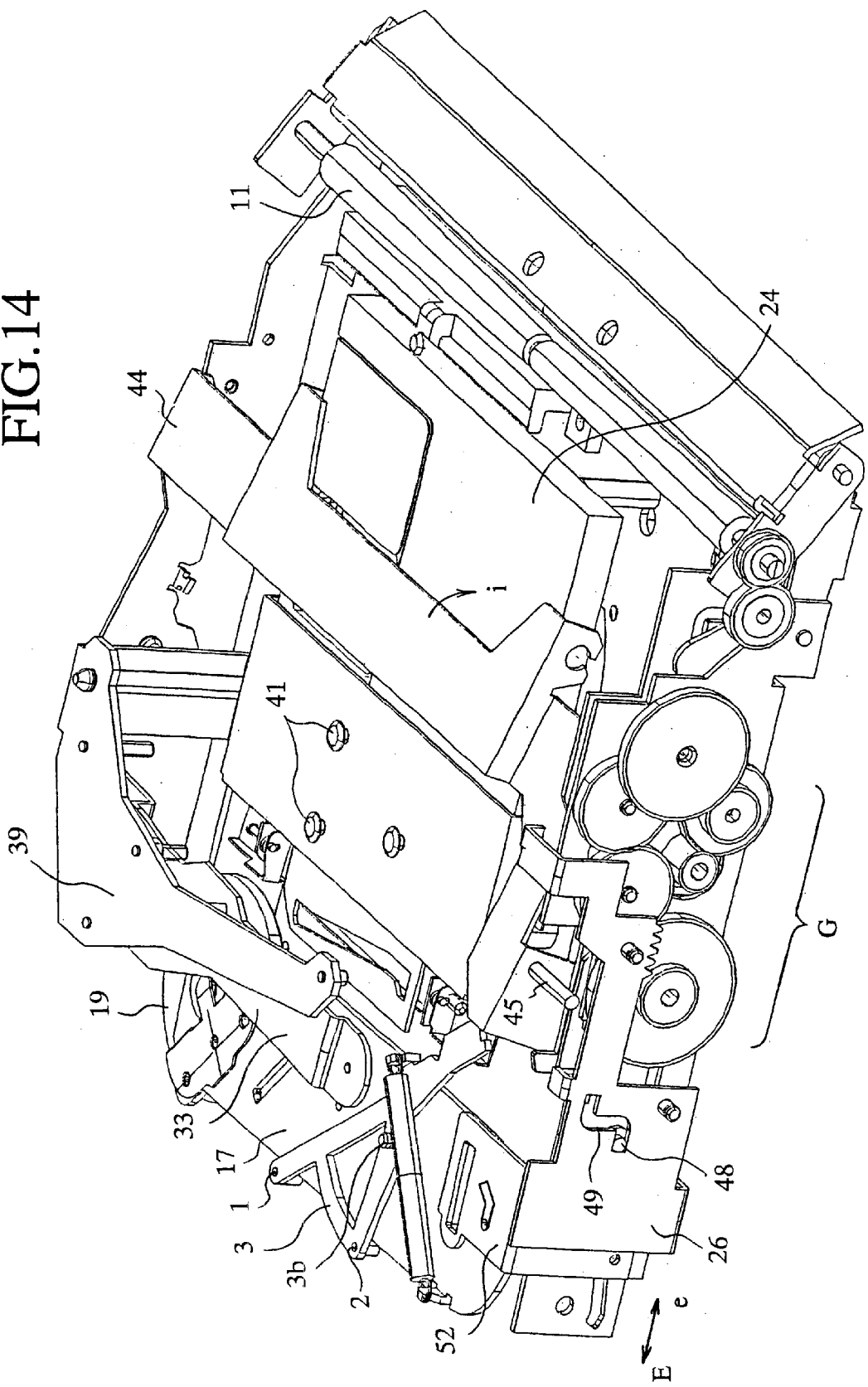
FIG. 14 is a three dimensional representation of the mechanism of a disk device in which an MD is played according to a first embodiment of the present invention.

FIG. 11 is a three dimensional representation of the mechanism of a disk device to which a member which functions when an MD is loaded has been added in a disk device according to a first embodiment of the present invention. Those components which are the same or similar as those in FIG. 1 are represented by the same reference numerals and their explanation is omitted. In the figure, 24 is an MD, 24a is a sliding cover for exposing a disk stored in a cartridge, 25 is an MD holder, 36 is a elongated hole which is formed on the MD holder 25, 39 is a holder drawing lever, 34 is a shaft about which the holder drawing lever 39 rotates, 35 is a pin which engages with the elongated hole 36 and is provided in proximity to the tip of the holder drawing lever 39. 37 is a pin which engages with the elongated hole 38 and which is formed in proximity to the middle of the holder drawing lever 39. 44 is an MD holder supporting member, 63 is a bearing for supporting the rotations of the gripping and guiding member 61 (FIG. 12) of the MD holder 25. 41 is a guiding pin provided on the MD holder 25. 45 is a pin provided on the side face of the MD holder support member 44. The pin 45 is formed so that the MD holder supporting member 44 is held horizontal by the pin riding on the horizontal face 46b of the upper section of the cam face 46 of the second sliding plate 6. When the pin 45 slides downwardly on the upper cam face 46 of the second sliding face 6 and separates from the cam face 46, the MD holder supporting member 44 inclines the MD insertion side downwardly as shown in FIG. 14.

In FIG. 11. 101 and 102 are CD guides which guide a CD from its upper surface and are disposed on both sides of the MD holder 25 and the upper section of the feeding roller 11. When a CD is inserted, the inserted CD is conveyed into the device by the feeding roller 11 by its upper face being guided by the guiding face of the CD guide 101, 102.

Figure 12:
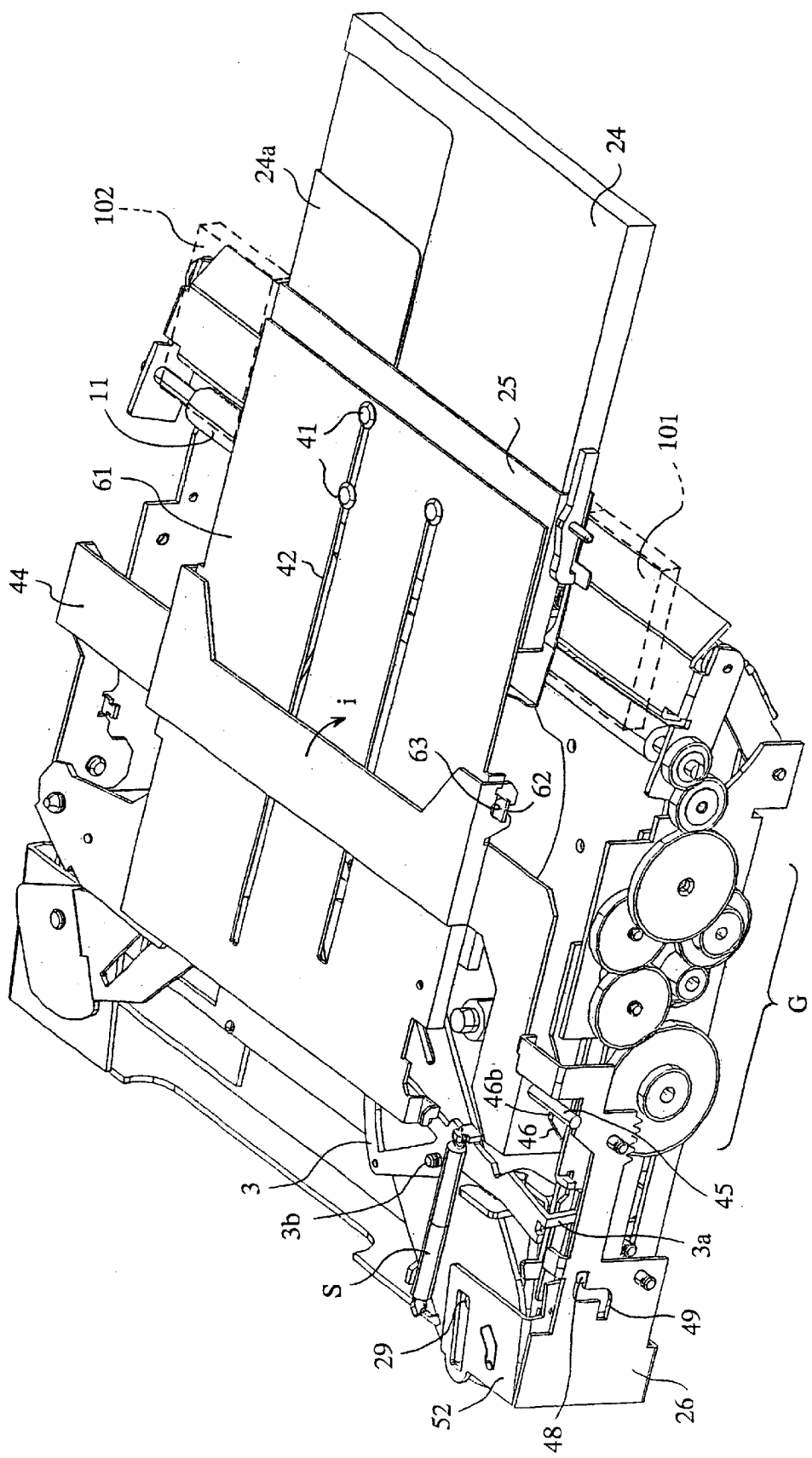
FIG. 12 is a three dimensional representation of the mechanism of a disk device to which a gripping and guiding member has been added in a disk device according to a first embodiment of the present invention.

FIG. 12 is a three dimensional representation of the mechanism of a disk device to which a gripping and guiding member has been added in a disk device according to a first embodiment of the present invention as shown in FIG. 11. In FIG. 12, those components which are the same or similar as those in FIG. 11 are denoted by the same reference numerals and their explanation will be omitted. In the figure, 42 is a guide hole which is formed on the gripping and guiding member 61, which engages with the pin and which guides the MD holder 25. 62 is a plate shaped axial body which projects on both side faces of the gripping and guiding member 61 and which engages with the bearing 63 which is formed on the MD holder supporting member 44.

Figure 13:
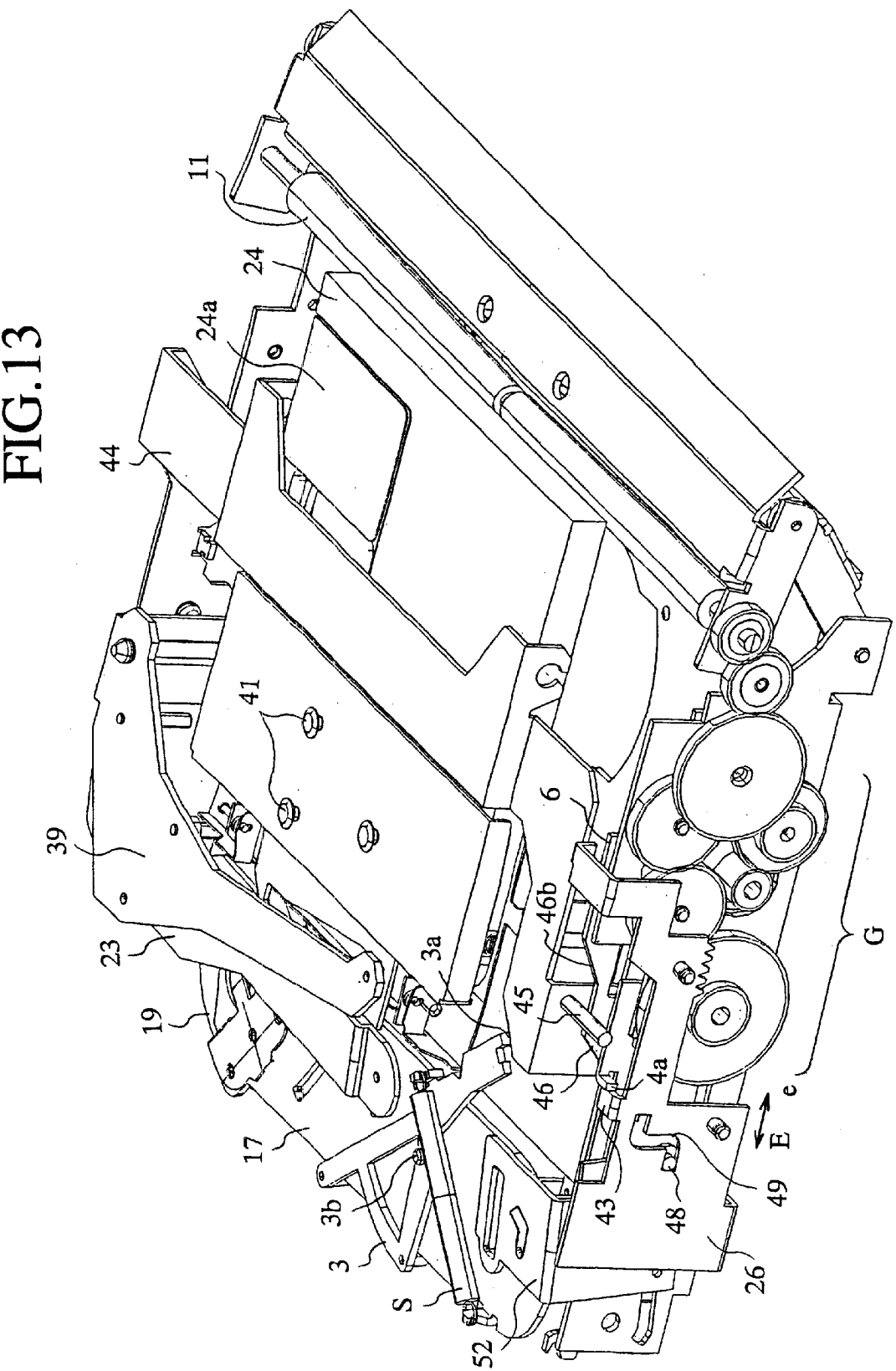
FIG. 13 is a three dimensional representation of the mechanism of a disk device in which an MD is fed by a feeding roller according to a first embodiment of the present invention.

FIG. 13 is a three dimensional representation of the mechanism of a disk device in which an MD is conveyed by a feeding roller according to a first embodiment of the present invention.

FIG. 14 is a three dimensional representation of the mechanism of a disk device in which an MD is played according to a first embodiment of the present invention.

Figure 15:
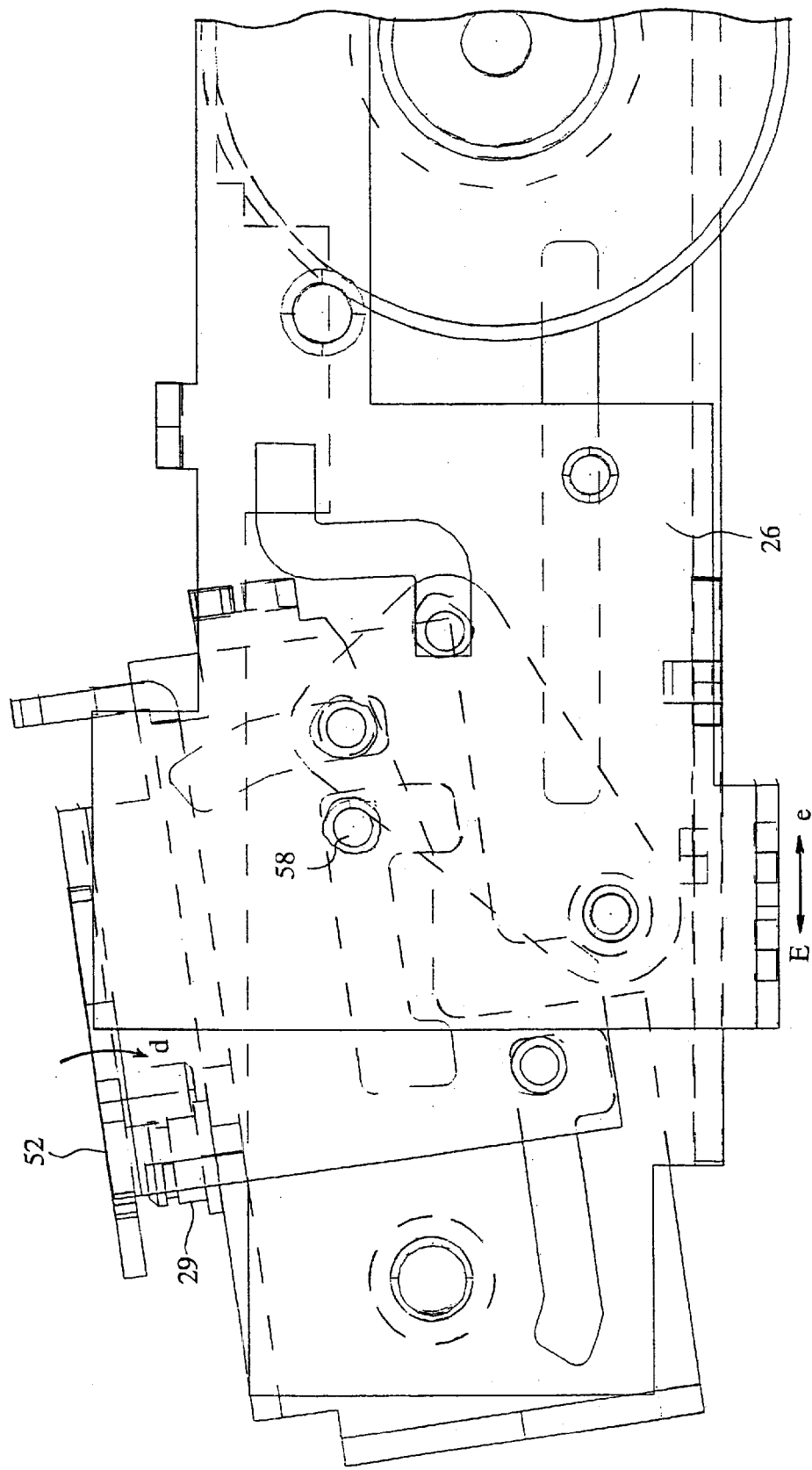
FIG. 15 is a partial lateral view of a disk device wherein the third sliding plate is displacing in the direction e of the arrow according to a first embodiment of the present invention.

FIG. 15 is a partial lateral view of a disk device wherein the third sliding plate 26 is displacing in the direction e of the arrow according to a first embodiment, of the present invention.

Figure 16:
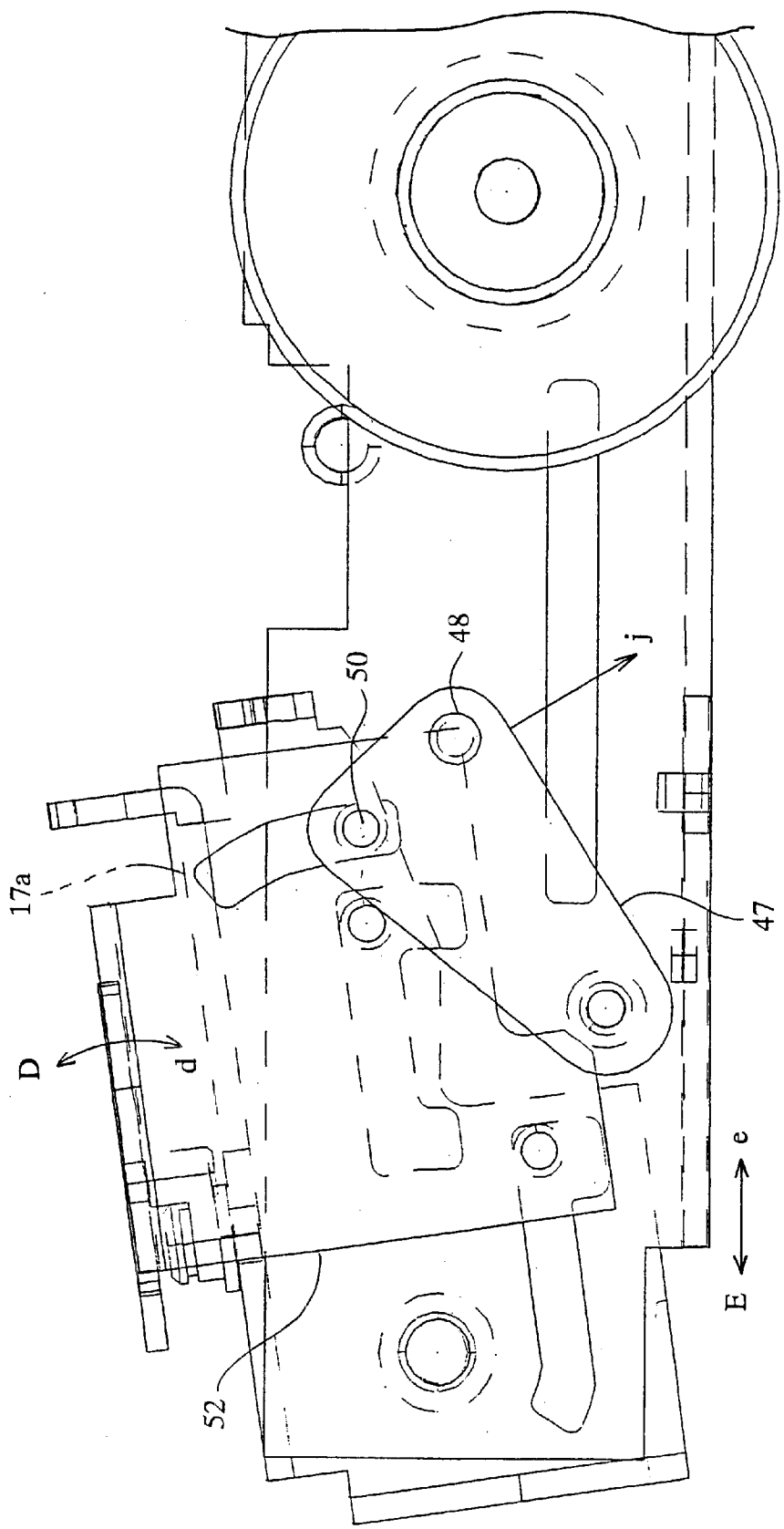
FIG. 16 is a partial lateral view of a disk device wherein the intermediate member is displacing in the direction e of the arrow due to a third sliding plate (not shown) according to a first embodiment of the present invention.

FIG. 16 is a partial lateral view of a disk device wherein the intermediate member 52 is displacing in the direction e of the arrow due to a third sliding plate 26 (not shown) according to a first embodiment of the present invention.

Figure 17:
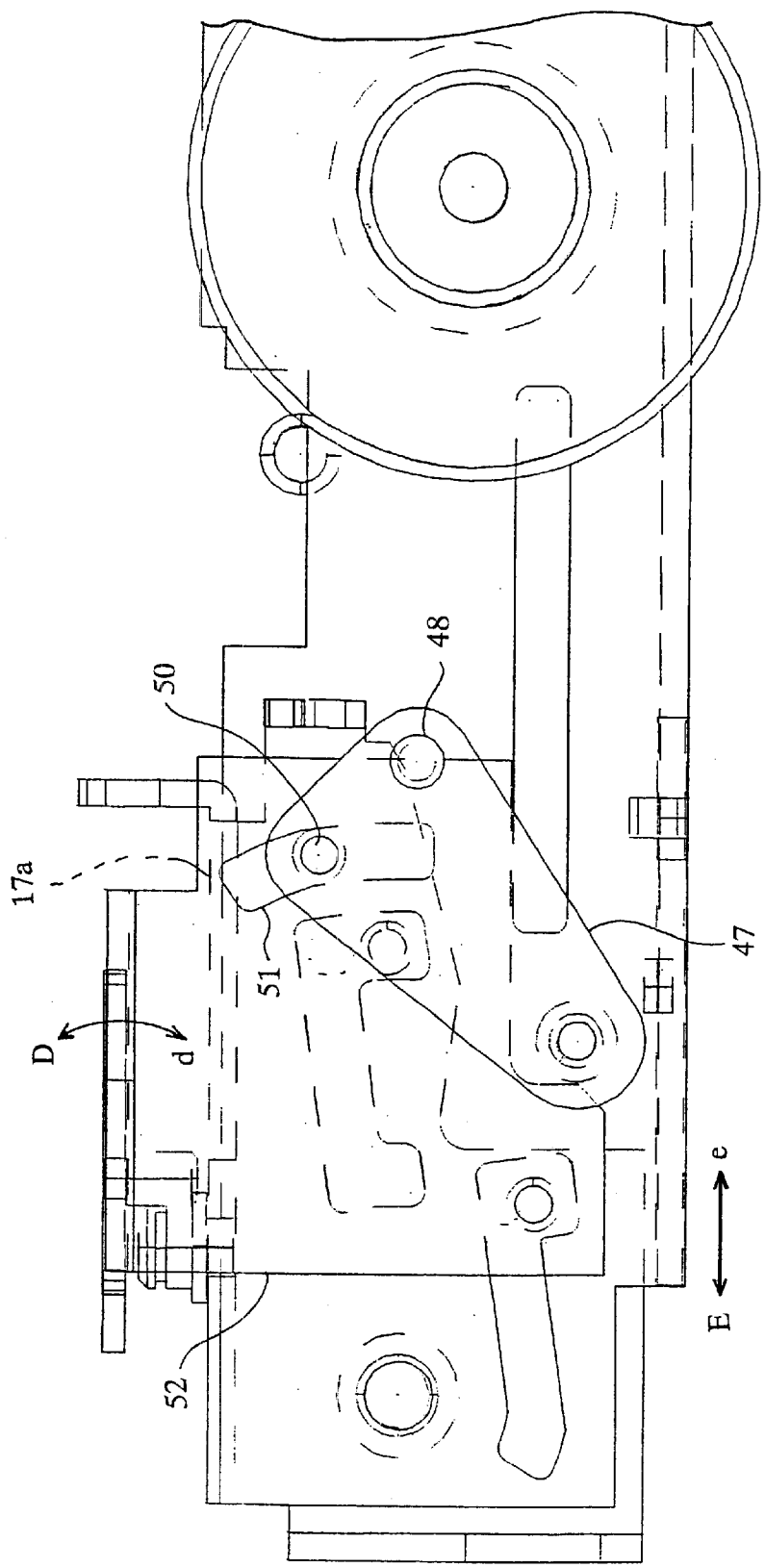
FIG. 17 is a partial lateral view of a disk device wherein an intermediate member is rotating in a direction d of the arrow according to a first embodiment of the present invention.

FIG. 17 is a partial lateral view of a disk device wherein an intermediate member 52 is rotating in a direction d of the arrow according to a first embodiment of the present invention.

Figure 18:
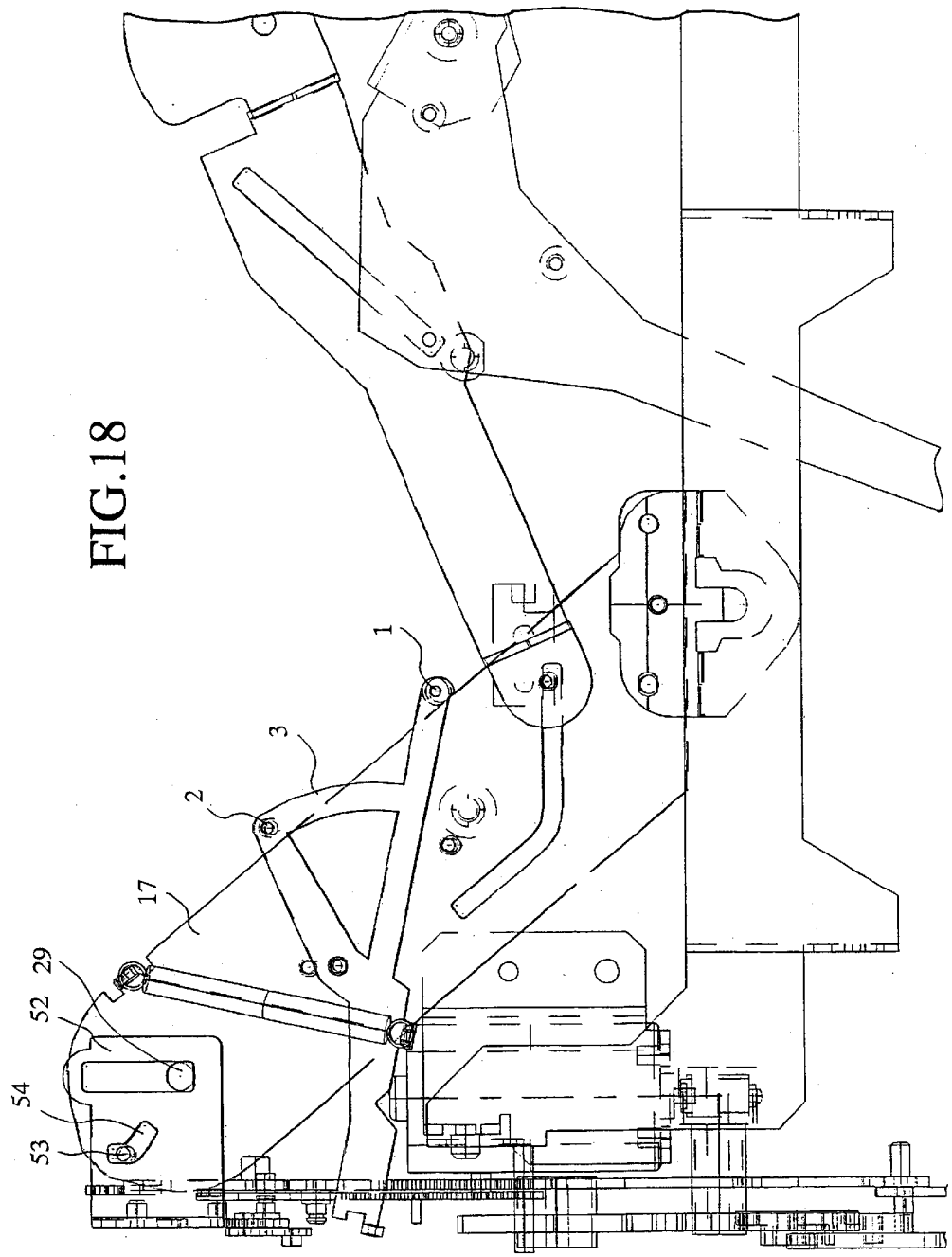
FIG. 18 is a partial front view of a disk device showing the mechanism by which the clamp lever is rotated in the rear direction when an MD is loaded according to a first embodiment of the present invention.

FIG. 18 is a partial front view of a disk device showing the mechanism by which the clamp lever 17 is rotated in the rear direction when an MD is loaded according to a first embodiment of the present invention.

Figure 19:
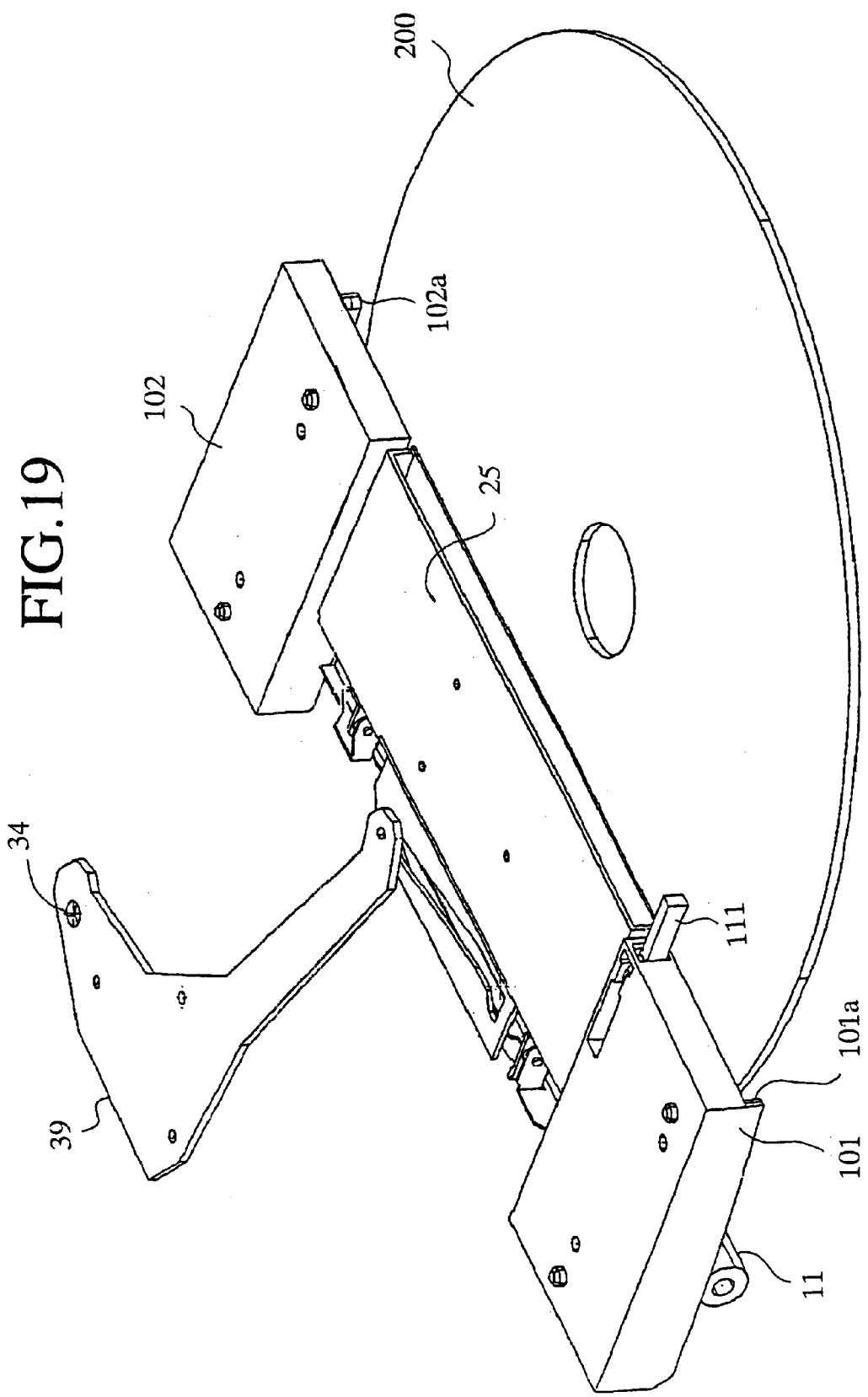
FIG. 19 is a three dimensional representation of the CD/MD insertion section when a CD is inserted according to a first embodiment of the present invention.

FIG. 19 is a three dimensional representation of the CD/MD insertion section when a CD 200 is inserted according to a first embodiment of the present invention. In the figure, 111 is an enlarging lever which enlarges the aperture of the MD holder 25 when an MD is inserted.

Figure 20:
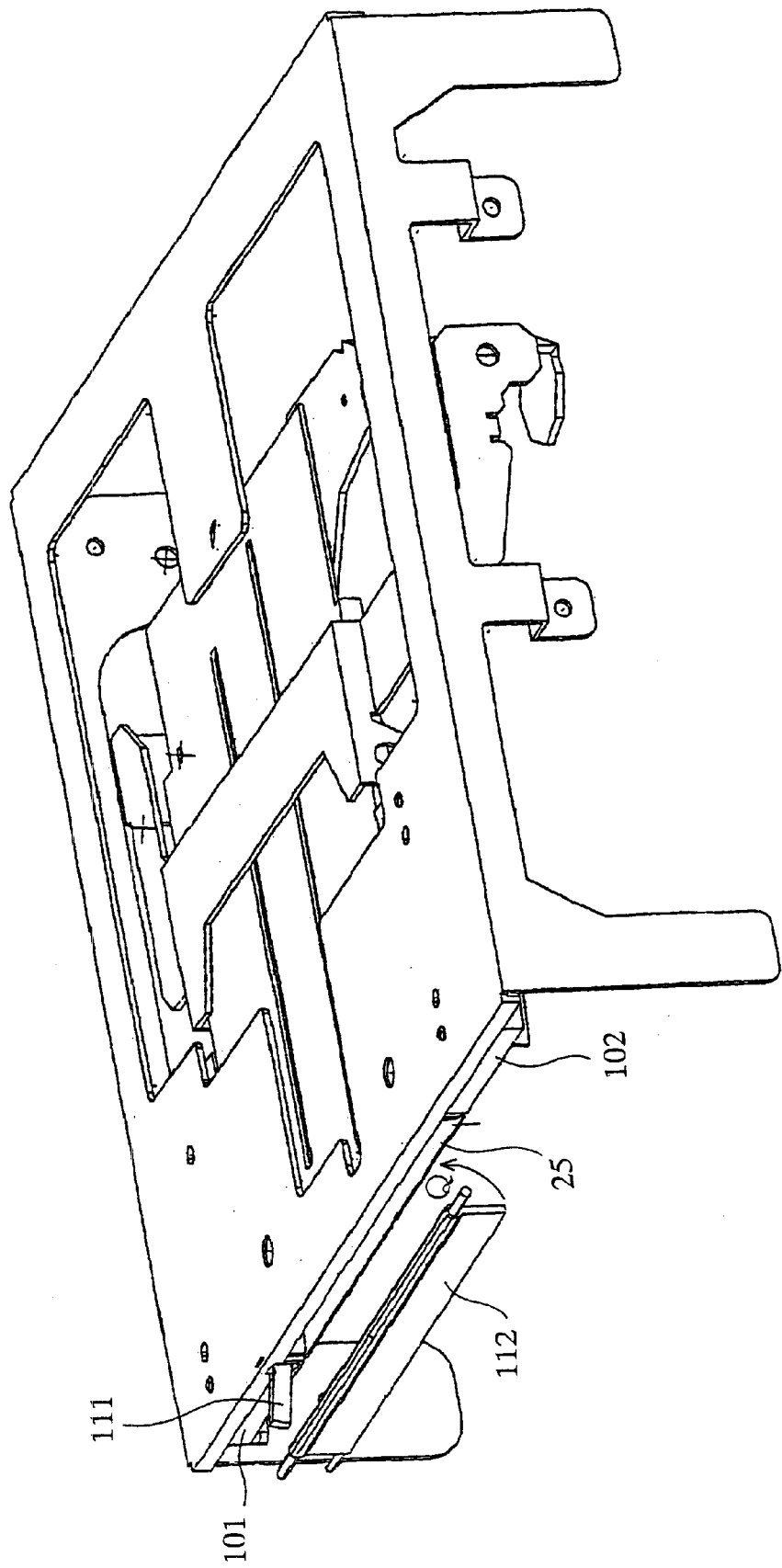
FIG. 20 is a three dimensional representation of the CD/MD insertion section according to a first embodiment of the present invention.

FIG. 20 is a three dimensional representation of the CD/MD insertion section according to a first embodiment of the present invention. In the figure, 112 is an MD insertion mouth dust cover which covers the MD insertion mouth of the MD/CD insertion section in order to prevent the entry of dust or the like. The cover 112 is adapted to rotate in the direction Q on abutting with an MD inserted from the MD insertion mouth. The MD insertion mouth dust cover 112 abuts with the side of the tip of an inserted MD when an MD is inserted from the CD/MD insertion section. However it is adapted not to abut with an inserted CD.

Figure 21:
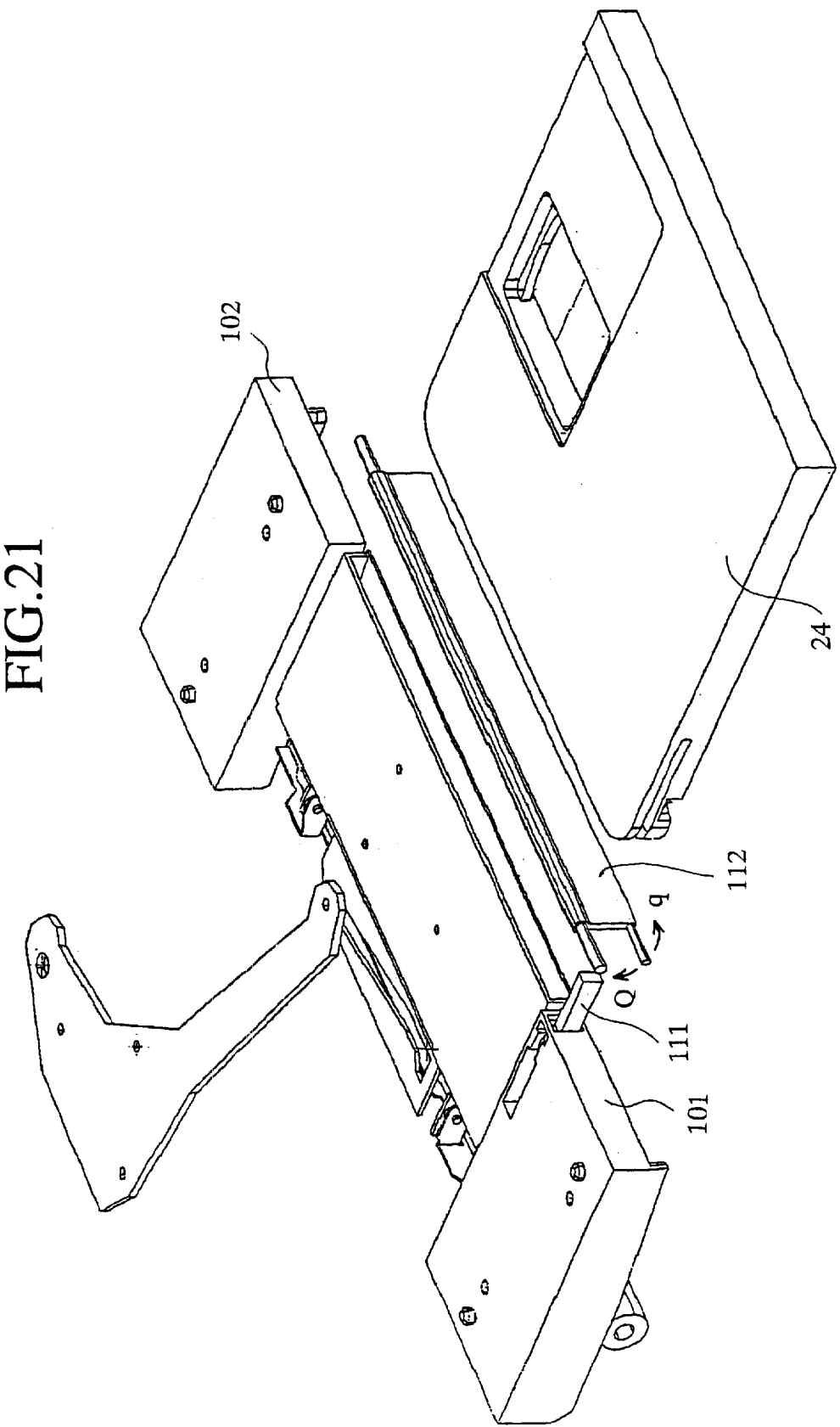
FIG. 21 is a three dimensional representation of an MD being inserted into insertion mouth of a disk device according to a first embodiment of the present invention.

FIG. 21 is a three dimensional representation of an MD 24 being inserted in to insertion mouth of a disk device.

Figure 22:
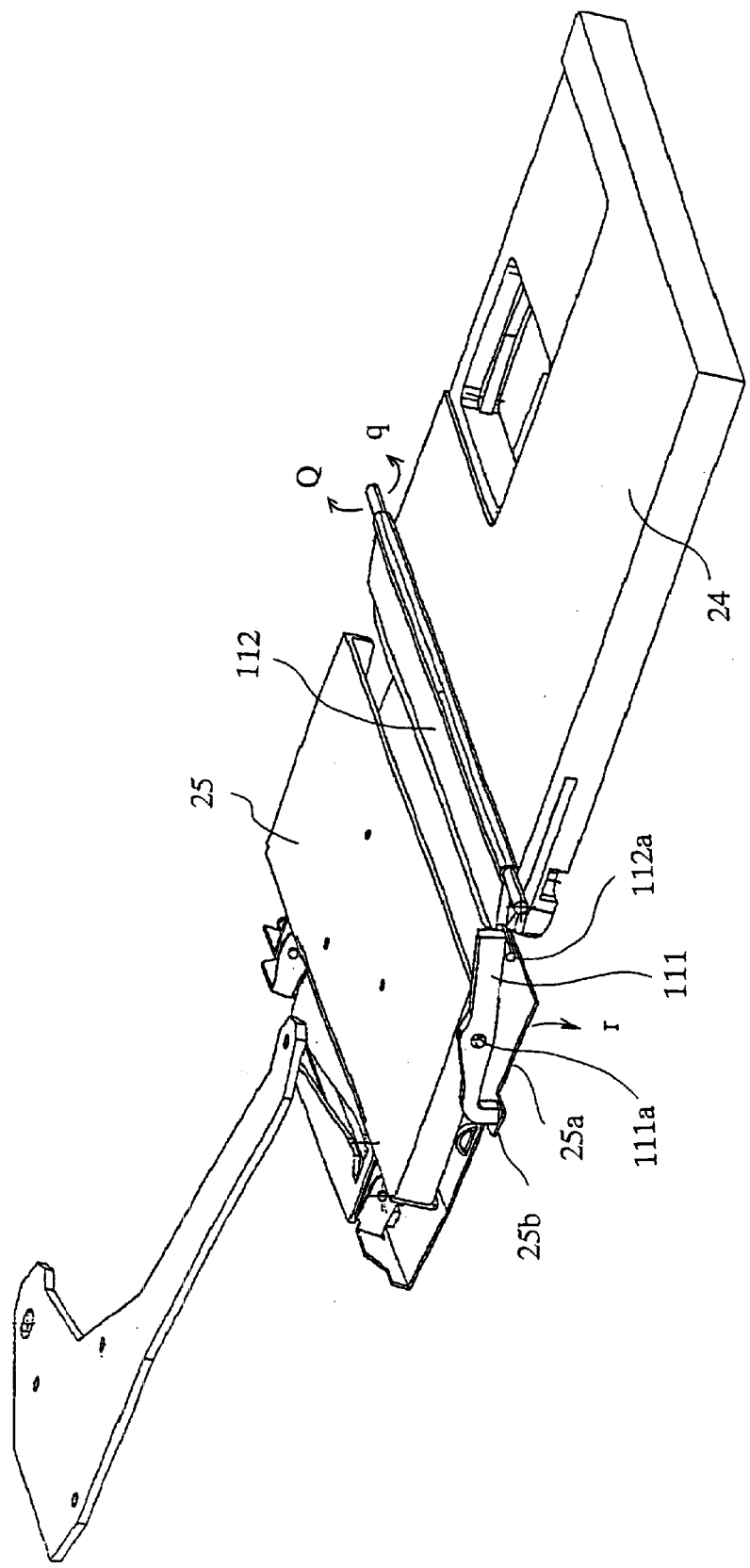
FIG. 22 is a three dimensional representation of the aperture of an MD holder being enlarged in a disk device according to a first embodiment of the present invention.

FIG. 22 is a three dimensional representation of the aperture of an MD holder 25 being enlarged by the MD insertion mouth cover 112 rotating in direction Q by abutting with an MD inserted into the MD insertion mouth in a disk device according to a first embodiment of the present invention. As shown in the figure, a pin 112a is provided on one side face of the MD insertion mouth cover 112. The MD insertion mouth cover 112 of the MD insertion mouth abuts with the side of the tip of the MD 24 inserted into the MD insertion mouth. As a result, the enlargement lever 111 is rotated about the shaft 111a by the pin 112a of the MD insertion mouth cover 112 which is rotated in direction Q raising an end of the enlargement lever 111 upwardly. The other end of the enlargement lever 111 abuts with the projection 25b of the MD holder aperture member 25a which is disposed on the lower side of the MD holder 25 which forms the aperture of the MD holder. The MD holder aperture member 25a opens in direction r and enlarges the aperture of the MD holder 25. Thus the insertion of an MD into the aperture of the MD holder is facilitated.

Figure 23:
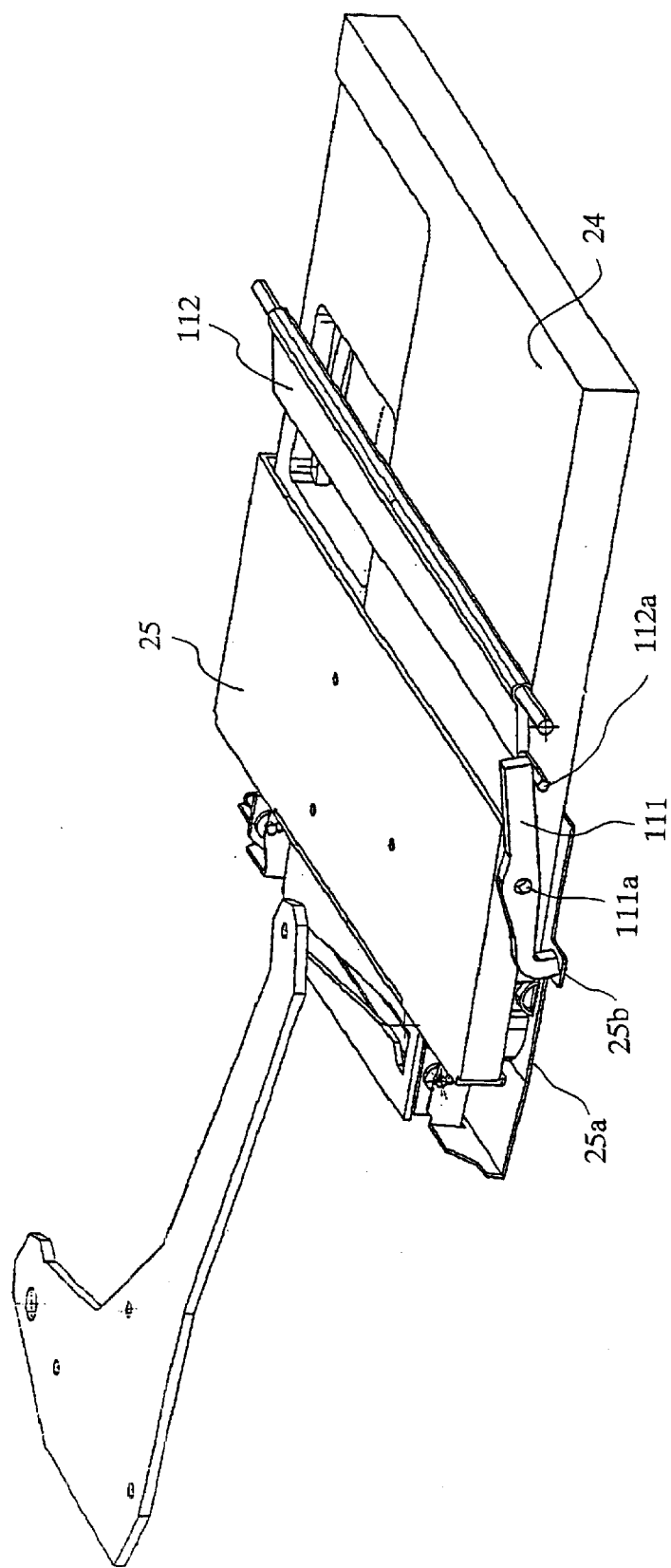
FIG. 23 is a three dimensional representation of an MD being inserted into the aperture of an enlarged MD holder in a disk device according to a first embodiment of the present invention.
Figure 24:
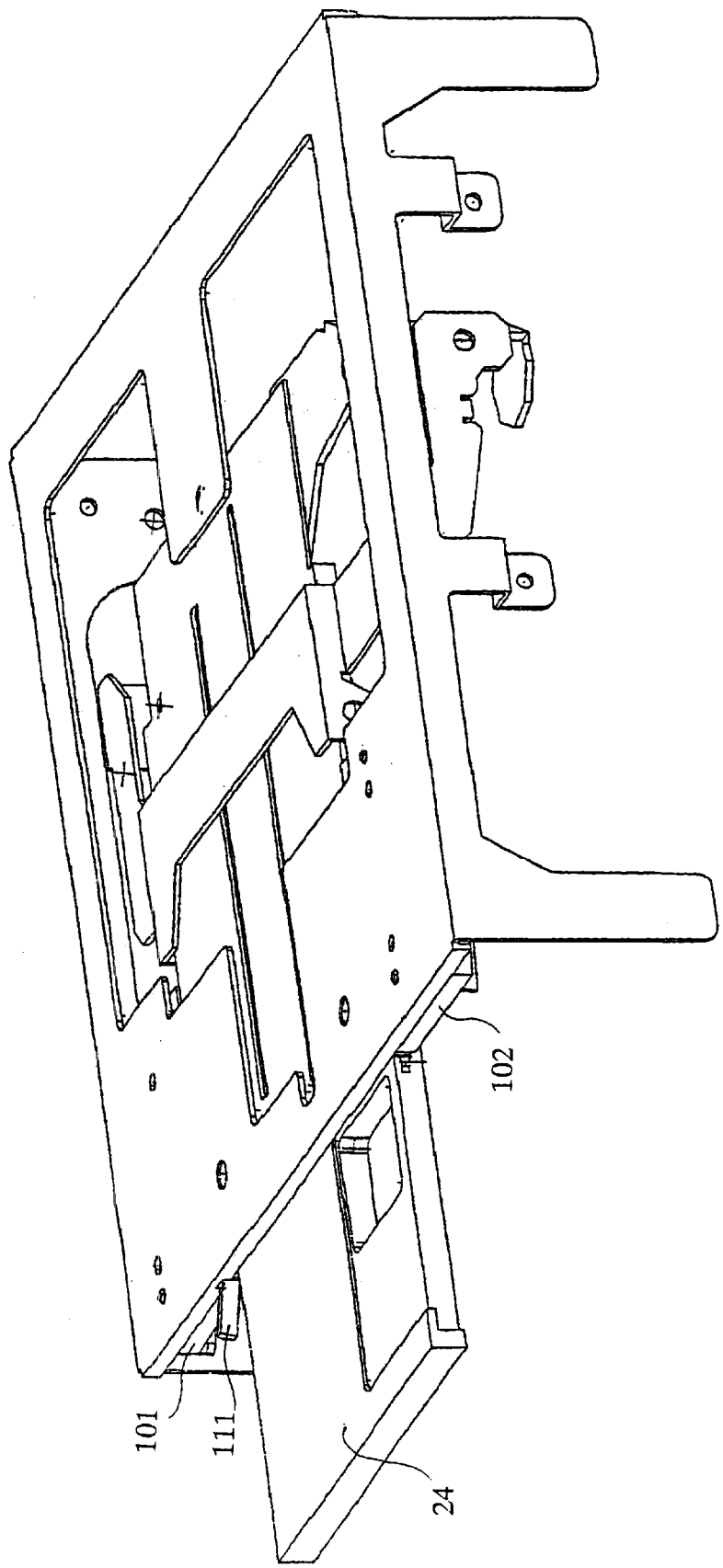
FIG. 24 is a three dimensional representation of an MD being inserted into the aperture of an enlarged MD holder in a disk device according to a first embodiment of the present invention.

FIG. 23 and FIG. 24 are three-dimensional representations of an MD 24 being inserted into the aperture of an enlarged MD holder 25 in a disk device.

From the discussion above, the term "CD conveying mechanism" used in the Claims corresponds to the gear unit G, the feeding roller 11 and the like, the term "clamp mechanism" refers to the small diameter abutting pin 1, the large diameter abutting pin 2, the lever 3, the engaging piece 3a, 4a, the first sliding plate 4, the second sliding plate 6, the pin 15, the "clamp lever support member" corresponds to clamp lever 17 and the clamp 19, the "MD feed mechanism" corresponds to the MD holder 25, link lever 33, the holder drawing lever 39, the guide pin 41, the guide hole 42, the gripping and guiding member 61 and the like. The "clamp lever refuge mechanism" refers to the clamp lever 17, the linking lever 33, the holder drawing lever 39 and the like. The term "feed roller displacement mechanism" refers to the first plate 4, the second plate 6, the feed roller support lever 12, the raising arm 13, the pin 14 and the S shaped elongated hole 55. The term "conveying roller contact avoidance mechanism" refers to the pin 21, the lever 22, the cam face 22a and the like.

The operation of the invention will be discussed below.

(CD Loading Operation)

When a CD is inserted into the disk device, a sensor detects the fact that a CD has been inserted. As a result, a drive motor (not shown) is operated and a gear unit G is driven. The feeding roller 11 is rotated in the direction aa shown in FIG. 7. As a result, the inserted CD is conveyed further into the device by the feeding roller 11.

In this state, when the inserted CD is a small diameter disk, the outer circumference of the small diameter disk abuts with the small diameter abutting pin 1. When the inserted CD is a large diameter disk, the outer circumference of the large diameter disk abuts with the large diameter abutting pin 2.

The CD is inserted further into the device by the feeding roller 11 when in a state in which the outer circumference has abutting pin 2. Thus the center of the CD 200 arrives at the center of the turntable. As a result, as shown in FIG. 7, the lever 3 rotates in direction a about the support point 3b due to the inserted CD 200.

When the lever 3 rotates in direction a, the engagement piece 3a displaces in direction b and abuts with the engagement piece 4a of the first sliding plate 4 and thus further slides the first sliding plate 4 in the direction e of the arrow.

As a result, as shown in FIG. 3, the rack 8 formed on the first sliding plate 4 engages with the gear 9, and the first sliding plate 4 further slides in direction e by the gear 9 which is rotating to the left.

When the first sliding plate 4 slides in direction e, the pin 5 which is formed on the first sliding plate 4 abuts with the end of the feeding roller 11 of the slit 7 which is formed on the second sliding plate 6 and the second sliding plate 6 slides in direction e.

As a result, the rack 10 which is formed on the second sliding plate 6 also meshes with the gear 9 and the gear 9 slides the first and second sliding plates 4, 6 in the direction e of the arrow.

When the second sliding plate 6 slides in direction e, the pin 14 which engages with the S-shaped elongated hole 55 formed on the second sliding plate 6 and is formed on the extension 13a of the lifting arm 13 as shown in FIG. 8 slides to the upper end of the S-shaped elongated hole 55 as shown in FIG. 9. As a result, the lifting arm 13 shown in FIG. 8 rotates about the shaft 13b in the other direction C, rotates the feeding roller supporting lever 12 in the direction Y and depresses the feeding roller 11 as shown in FIG. 9.

Since the pin 15 which is formed on the second sliding plate 6 displaces in the direction e due to the second sliding plate sliding in the direction e, the pin 15 which is abutting with the cam face 16, which is formed on the clamp lever supporting member 17a as shown in FIG. 3, slides on the cam face 16 and the pin 15 is separated from the cam face 16 as shown in FIG. 9.

As a result, the clamp lever supporting member 17a, the intermediate member 52 and the clamp lever 17 rotate in the direction D as shown in FIG. 7. The clamp 19 which is formed on the tip of the clamp lever 17 as shown in FIG. 10 clamps the CD 200 on the turntable from above.

(CD Ejecting Operation)

During CD ejection operation, the drive motor rotates in the opposite direction to that during CD loading operation. As a result, the gear 9 rotates in the right direction as shown in FIG. 9 and the first and second sliding plates 4, 6 slide in the direction E.

When the second sliding plate 6 slides in direction E, the pin 15 which is formed on the second sliding plate 6 abuts with the cam face 16 of the clamp lever supporting member 17a and rotates the clamp lever supporting member 17a about the rotation shaft 18 in the direction D. As shown in FIG. 3, the gripping of the CD 200 by the clamp 19 and the turntable is released and the relationship of the clamp 17 and the CD 200 is as shown in FIG. 7.

The pin 14 which engages with the S-shaped elongated hole 55 displaces to the lower end of the S-shaped elongated hole 55 by sliding in the S-shaped elongated hole 55 from the position shown in FIG. 9 due to the displacement of the second sliding plate 6 in direction E. As a result, the lifting arm 13 rotates in the direction C shown in FIG. 8, the feeding roller 11 is raised and abuts with the rear face of the CD 200. Thus the feeding roller support lever 12 and the feeding roller 11 are the position as shown in FIG. 3.

At this time, the CD 200 is ejected from the device by the rotating feeding roller 11 since the gear unit G is rotated in direction AA shown in FIG. 7 by the drive motor.

When rack 8 of the first sliding plate 4 and the rack 10 of the second sliding plate 6 are separated from the gear 9, the first and second sliding plates 4 and 6 are displaced even further in direction E and return to an initial position as shown in FIG. 2.

The action of ejecting a CD as explained above is the same for both small and large disks. Since the possibility of the raised feeding roller 11 coming into contact with the edge of a small diameter disk exists, the lever 22 is rotated in direction M about the shaft 23 by the action of the pin 21 provided on the second sliding plate 6 on the cam face 22a due to the second sliding plate 6 displacing in direction E. Thus the feeding roller 11 is prevented from contacting with the edge of the small diameter disks as the peripheral section on the feeding roller abutting side of the small diameter disk is raised upwardly.

(MD Loading Operation)

When an MD 24 is inserted into the MD insertion mouth in the CD/MD insertion section, as shown in FIG. 22, the side of the tip of the inserted MD 24 abuts with the MD insertion mouth screen 112. As a result, the MD insertion mouth screen 112 rotates in direction Q and raises an end of the enlarging lever 111 upwards. The other end of the enlarging lever 111 is rotated about the shaft 111a and pushes the projection 25b downwards. The MD holder aperture member 25a is opened in the direction r as a result, and the aperture of the MD holder 25 widens. In this position, when the MD 24 is further inserted, the MD 24 becomes inserted into the MD holder 25 as shown in FIG. 11.

When an MD 24 is inserted into the MD holder 25, the insertion is detected by a sensor (not shown). A drive motor (not shown) is activated to drive a gear unit G. As a result, the third sliding plate 26 is displaced in the direction e shown in FIG. 15 by a member (not shown). A rack 27 formed on the third sliding plate 26 meshes with the gear 28 and thereafter the third sliding plate 26 displaces in the direction e due to the rotations of the gear 28. Since the pin 48 of the relay member 47 engages with the S-shaped elongated hole 49, it rotates in direction j as shown by FIG. 16. An intermediate member 52 which has the arc-shaped elongated hole 51 with which the pin 50 of the relay member 47 has engaged displaces in the same direction as the third sliding plate 26.

The engaging piece 43 of the third sliding plate 26 pushes the engaging piece 4a of the first sliding plate 4 as the third sliding plate 26 displaces in the direction e. Thus the first sliding plate 4 is displaced in direction e. As a result, the movement of the first and second sliding plates 4 and 6 is the same as the action explained above when loading a CD.

On the other hand, together with displacement of the intermediate member 52, the pin 53 formed on the intermediate member 52 as shown in FIG. 18 abuts with an end of the slit 54 of the clamp lever 17. The clamp lever 17 rotates in direction f about the rotation shaft 29 and displaces to a rear position which will not impede the loading of the MD 24.

The link lever 33 displaces in direction g about the shaft 30 due to the rear displacement of the clamp lever 17. As a result, the holder drawing lever 39 rotates in the direction h about the shaft 34. Thus the MD holder 25, on which the elongated hole 36 is formed which engages with the pin 35 of the tip of the holder drawing lever 39, is drawn into the device as shown in FIG. 13.

The MD holder 25 is drawn into the device without any positional divergence by the guide hole 42 and the guide pin 41 as shown in FIG. 12.

The MD 24 opens the slidable screen 24a by a member (not shown) to the degree to which it is drawn into the device and is drawn to a fixed position in the device.

The pin 45 which is provided on the lateral face of the MD holder supporting member 44 slides downwardly on the cam face 46 which is formed on the second sliding plate 6 due to the displacement of the second sliding plate which accompanies the movement of the second sliding plate 6 in direction e. As a result, the MD holder supporting member 44 inclines towards the MD insertion side in direction i as shown in FIG. 14. Thus the MD is placed on the turntable.

The plate shaped shaft 61 which projects to both lateral sides of the gripping and guiding member 61 rotatable engages with the bearing 63 formed on the MD holder support member 44 as shown in FIG. 12. Thus even if the MD holder support member 44 inclines in direction i, the gripping and guiding member 61 can attain a horizontal state. In this way, an MD 24 which is gripped by the MD holder 25 can be placed horizontally on the turntable as shown in FIG. 14.

When the MD 24 as shown in FIG. 14 is placed on the turntable, the feeding roller 11 is depressed in the same way as explained when a CD is stored.

(MD Ejection Operation)

When an MD 24 which has been placed on a turntable is ejected outside the device, a drive motor (not shown) rotates in the opposite direction to that when an MD is loaded. As a result, the first and second sliding plates 4 and 6 displace in direction E and their orientation changes from that shown in FIG. 14 to that shown in FIG. 13. The third sliding plate 26 is displaced in direction E and the MD 24 is gripped by the MD holder 25 as shown in FIG. 12. Thus the MD can be ejected to the outside of the device from the MD insertion mouth in the CD/MD insertion section as the MD insertion mouth cover 112 opens in direction q as shown in FIG. 21.

As shown above, according to embodiment 1, a disk device is obtained which can convey MDs which are cartridge stored disks, small and large diameter disks and load and eject such types of disks onto and from a turntable with high reliability by using a common drive motor.

Furthermore according to embodiment 1, since CD guides 101, 102 are disposed on both sides of the MD holder 25, it is possible to reduce the width of the device.

furthermore according to embodiment 1, since the aperture of the MD holder 25 is enlarged when an MD is inserted from an MD insertion mouth, it is simple to load an MD into the MD holder 25 and thus user-friendliness is enhanced.

As shown above, the disk device of the present invention is adapted for use as a vehicle-mounted disk device which can be used with either disks of varying outer diameters or cartridge stored disks such as MDs.

What is claimed is:

1. A disk device which conveys circular disks of different sizes and cartridge-stored disks in cartridge-stored form, loads said disks onto a turntable and ejects said disks from said turntable, said disk device comprising:

an optical pickup for reading information recorded on said circular disk;

a CD feed mechanism having a feeding roller for performing the uptake and ejection of circular disks;

a clamp mechanism for pressing a central section of a circular disk taken up by said CD feed mechanism from above and mounting said disk on said turntable;

an MD conveying mechanism for performing the uptake of a cartridge-stored disk, mounting of said cartridge-stored disk onto said turntable, and ejection of said cartridge-stored disk from said turntable in a state where said cartridge-stored disk is inserted into said MD holder, by the movement of a conveying arm which forms a section of a link mechanism;

a clamp lever refuge mechanism for refuging said clamp lever of said clamp mechanism to a position which does not interfere with the uptake and ejection of said cartridge-stored disk when said cartridge-stored disk is taken up and ejected by said MD feed mechanism; and a feed roller displacement mechanism for displacing a position of said feed roller to a position lower than an initial position when a circular disk is inserted and further towards the direction of disk insertion than said optical pickup, said mechanism performing such displacement when said circular disk taken up by said CD feed mechanism is mounted on said turntable, said feed roller mechanism returning a position of said feed roller from a position lower and further towards the direction of disk insertion than said optical pickup to an initial insertion position when said circular disk is ejected from said turntable.

2. A disk device according to claim 1, further comprising a feed roller contact avoidance mechanism for raising a peripheral section of an ejected circular disk, which abuts with said feed roller, in a direction returning said feed roller to an initial position together with a return operation of said feed roller to an initial position by said feed roller displacement mechanism, and for preventing said returned feed roller from contacting with an edge of said circular disk.

* * * * *